US012203850B1

(12) United States Patent
Dawson et al.

(10) Patent No.: US 12,203,850 B1
(45) Date of Patent: Jan. 21, 2025

(54) POLAR-AZIMUTH SPECTRAL IMAGING AND ANALYSIS DEVICE WITH MODULAR SAMPLE STAGE

(71) Applicant: Florida Polytechnic University, Lakeland, FL (US)

(72) Inventors: Nathan Dawson, Lakeland, FL (US); Hengzhou Liu, Lakeland, FL (US); Anthony Fiorito, III, Lakeland, FL (US)

(73) Assignee: Florida Polytechnic University, Lakeland, FL (US)

( * ) Notice: Subject to any disclaimer, the term of this patent is extended or adjusted under 35 U.S.C. 154(b) by 0 days.

(21) Appl. No.: 18/890,275

(22) Filed: Sep. 19, 2024

(51) Int. Cl.
*G01N 21/64* (2006.01)

(52) U.S. Cl.
CPC ....... *G01N 21/64* (2013.01); *G01N 2201/021* (2013.01); *G01N 2201/025* (2013.01); *G01N 2201/0636* (2013.01); *G01N 2201/08* (2013.01)

(58) Field of Classification Search
CPC ............ G01N 21/64; G01N 2201/021; G01N 2201/025; G01N 2201/0636; G01N 2201/08
See application file for complete search history.

(56) References Cited

U.S. PATENT DOCUMENTS

| | | | |
|---|---|---|---|
| 7,173,699 B2 | 2/2007 | Xu et al. | |
| 7,557,919 B2 | 7/2009 | Fukue | |
| 2005/0200948 A1 | 9/2005 | Trulson et al. | |
| 2009/0276923 A1* | 11/2009 | Sumetsky | B82Y 35/00 850/32 |
| 2021/0341389 A1* | 11/2021 | Wang | G01N 21/6486 |

OTHER PUBLICATIONS

Dawson et al., "Low-cost automated spin coater and thermal annealer for additive prototyping of multilayer Bragg reflectors" Am. J. Phys. 91, 48-55 (2023). Jan. 1, 2023.
Dawson, Nathan J. et al. "Reduced ASE threshold from aperiodic photonic structures in rhodamine B-doped king salmon (oncorhynchus tshawytscha) iridophores." J. Lumin. (2022). Sep. 24, 2021.

* cited by examiner

*Primary Examiner* — David P Porta
*Assistant Examiner* — Meenakshi S Sahu
(74) *Attorney, Agent, or Firm* — Smith & Hopen, P.A.; Andrew Behrens; Anton J. Hopen

(57) ABSTRACT

The invention concerns an apparatus for scanning the optical properties of materials using a stationary sample stage and a dual-axis rotational system. The apparatus includes motors for azimuthal and polar rotation, supporting an optical system with adjustable lenses and filters to collect data from multiple angles. This design is particularly advantageous for photo-excited materials using linearly polarized sources, as it maintains static pump polarization, eliminating the need for additional motors or optical elements to align the pump with the sample's rotation. This avoids complications with halfwave plates and broadband retarders, which may not preserve linear polarization across all wavelengths. The modular system accommodates various detectors, ensuring versatility while enabling precise, high-resolution spectral imaging. The stationary sample stage prevents alignment issues and distortion, providing consistent and accurate measurements of materials' optical properties across a range of experimental setups.

30 Claims, 21 Drawing Sheets

POLAR-AZIMUTH SPECTRAL IMAGING AND ANALYSIS DEVICE WITH MODULAR SAMPLE STAGE

GOVERNMENT INTEREST

This invention was made with Government support under Grant No. 2337595 awarded by the National Science Foundation, Division of Materials Research. The Government has certain rights in the invention.

BACKGROUND OF THE INVENTION

1. Field of the Invention

The described embodiments relate generally to an apparatus for scanning the optical properties of materials using a stationary sample stage and a dual-axis rotational system. Specifically, the described embodiments relate to systems and methods for scanning the spectrum of an emissive material as a function of spherical angles.

2. Brief Description of the Related Art

There has been an increasing need in research for the development of an instrument or apparatus which can scan optical properties of emissive materials without the need of waveplates or broadband retarders. This is critically important in areas of research which focus on scanning the optical properties of photo-excited materials. The typical process involves devices which use additional motors or optical elements such as waveplates or broadband retarders to align a pump beam's polarization with a rotating sample. These additional parts can increase complications, which results in a higher rate of incorrectly collected data. However, there remains a need to be able to capture the optical properties of photo-excited materials without having the need to utilize excessive optical elements or additional motors to align the pump polarization with the sample material to ensure proper data collection.

Devices such as spectrometers and monochromators typically use dispersive and diffractive optical elements to separate frequencies of incident light. Such devices can routinely achieve sub-nanometer wavelength sensitivity in the visible regime. Imaging cameras typically capture a scene on a Cartesian grid. Color cameras separately image light in three frequency ranges (blue, green, and red). Hyperspectral cameras often employ optical filters to separately image frequency ranges with smaller widths. Directivity measurements are often performed on radio frequency (RF) antennas to characterize the power as a function of the azimuth and polar angles. Some optical characterization instruments use automated translation and rotation to map an object. Examples of devices include optical ellipsometers for complex refractive index characterization, optical profilometers for surface topography profiling, near-field scanning optical microscope (NSOM), and spinning-disk confocal microscopes. 3D scanners typically rotate a camera in the polar direction and rotate an object; however, devices that rotate the sample stage can affect the pump beam's alignment during the scan and upon photoexcitation. Small changes in sample orientation with respect to polarization direction can have a strong effect on the emission, especially for nonlinear optical phenomena such as laser emission.

Materials can emit photons in the ultraviolet, visible, and infrared regions of the spectrum through quantum mechanical processes. These processes are typically driven by electrical current, chemical reactions, and photo-induced excitation. The emission can have varying degrees of temporal and spatial coherence. Common emission profiles include fluorescence, amplified spontaneous emission ("ASE"), and laser light. Nanoscale and microscale structures can affect the spectrum, polarization, and coherence of emitted light in different directions. Examples of materials and devices that can be characterized from this device include LED devices with diffuser caps, output end of an optical fiber, microcavity lasers, and stained biological material excited by light.

By being able to keep the sample stage stationary, the orientation of the sample with respect to the light source remains consistent. This is critical when precision is needed. Moving a sample could introduce alignment issues or inconsistencies in the measurements, especially when dealing with delicate or highly sensitive materials. Devices currently known struggle with this very issue since they require either the sample to be moved before each data point is collected or the sample stage must also move to collect data. If a sample is rotated, then the pump polarization must also be rotated by the same amount. This required additional motors and optical elements such as halfwave plates. Halfwave plates are designed only for specific wavelengths, which means that each pump wavelength must either have a matching halfwave plate or halfwave broadband retarder. Broadband retarders are optimized for wavelength ranges and fail to perfectly preserve linear polarization in much of that range. Being able to rotate the measurement apparatus around the material would eliminate the need for halfwave plates and broadband retarders. It would also further simplify alignment for scanning a material. By moving the scanning apparatus instead of the sample, the system could be more easily aligned with the pump beam. The apparatus could capture a broad area while sweeping around the sample. A sample on an automated rotating stage is also more sensitive to vibrations from the stage motor.

Accordingly, what is needed in the art is a device which spherically scans an emitter's spectrum with relatively high resolution without the need to utilize waveplates, broadband retarders, or additional motors. This offers the ability to avoid complications with additional optical elements and ensures versatility while preventing alignment issues and distortion.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

BRIEF SUMMARY OF THE INVENTION

The long-standing but heretofore unfulfilled need, stated above, is now met by a novel and non-obvious invention disclosed and claimed herein. In an embodiment, the present disclosure pertains to an apparatus for scanning properties of a material, comprising: (a) a stationary sample stage which may be configured to support a material in a fixed position; (b) a first motor may operatively connect to a horizontal jib arm, the first motor may be configured to rotate the jib arm about a first axis to scan the material along an azimuthal angle; (c) a second motor may be mounted on the horizontal jib arm, the second motor may be configured to rotate about a second axis, perpendicular to the first axis, such that it may scan the material along a polar angle; (d) a boom arm that may attach to the second motor, the boom arm may extend away from the jib arm such that it may support an optical system directed toward the sample stage; (e) the optical system may comprise of a tube assembly to secure adjustable imaging lenses and optical filters, the tube assembly may be positioned to collect an amount of radiation from the material; (f) a sensor attachment mounted on the tube assembly, the sensor attachment may be configured to connect to at least one detector for capturing data related to the material; and (g) a control system that may communicatively couple to the first and second motors, the control system may be configured to transmit an electrical signal to the first and second motors to such that it may coordinate a rotation of the jib arm and boom arm, such that it may enable scanning of the material across a range of azimuthal and polar angles.

In some embodiments, the apparatus may further comprise a static pump polarization system, wherein the static pump polarization system is configured to maintain the orientation of a linearly polarized excitation source relative to the photonic structure of the material during the scanning process. Additionally, the apparatus may further comprise a base mount, wherein the base mount is engaged with the stationary sample stage, whereby the base mount translates the stationary sample stage along an x-axis and a y-axis.

In some embodiments, the apparatus may further comprise a mirror system, wherein the mirror system positioned vertically over the stationary sample stage, the mirror system may be configured to direct an external light source incident on the stationary sample stage.

The apparatus may further comprise an X-Y micro-positioning stage, wherein the X-Y micro-positioning stage is mechanically engaged with the stationary sample stage configured to traverse the stationary sample stage along an x axis and a y axis. The apparatus may further comprise a base plate such that the base plate may be configured to secure the apparatus onto a surface.

Additionally, in some embodiments, the apparatus may further comprise a spectrometer mounted onto the boom arm. Furthermore, in some embodiments, the at least one detector for capturing data within the sensor may comprise at least one of a digital camera, photodiode, spectrometer, phototransistor, pyroelectric, or thermopile. Moreover, the sensor attachment mounted to the tube assembly may be configured to be manipulated about an x axis, y axis, and a z axis. Additionally, the stationary sample stage may consist of a piezoelectric cooling stage, temperature-controlled stage, thermoelectric cooling stage, cryogenic cooling stage, and a combination thereof.

Moreover, another aspect of the present disclosure pertains to an apparatus for scanning properties of a material. In an embodiment, the apparatus may comprise the following: (a) a stationary sample stage which may be configured to support a material in a fixed position; (b) a first motor that may operatively connect to a rotation stage, the first motor may be configured to rotate the rotation stage about a first axis such that it may scan the material along an azimuthal angle; (c) a second motor may be mounted on the horizontal jib arm, the second motor may be configured to rotate about a second axis, perpendicular to the first axis, such that it may scan the material along a polar angle; (d) a boom arm that may attach to the second motor, the boom arm may extend away from the jib arm such that it may support an optical system directed toward the sample stage; (e) the optical system may comprise of a tube assembly to secure adjustable imaging lenses and optical filters, the tube assembly may be positioned to collect an amount of radiation from the material; (f) a sensor attachment mounted on the tube assembly, the sensor attachment may be configured to connect to at least one detector for capturing data related to the material; and (g) a control system that may communicatively couple to the first and second motors, the control system may be configured to transmit an electrical signal to the first and second motors to such that it may coordinate a rotation of the jib arm and boom arm, such that it may enable scanning of the material across a range of azimuthal and polar angles.

Furthermore, in some embodiments, the rotation stage may further comprise a central boring, such that the stationary sample stage may extend through the central boring. In some embodiments, the apparatus may further comprise a static pump polarization system, such that the static pump polarization system is configured to maintain the orientation of a linearly polarized excitation source relative to the photonic structure of the material during the scanning process.

Additionally, in some embodiments, the apparatus may further comprise a base mount, such that the base mount is engaged with the stationary sample stage, whereby the base mount translates the stationary sample stage along an x axis and a y axis.

In, some embodiments, the apparatus may further comprise a mirror system, such that the mirror system may be positioned vertically over the stationary sample stage, the mirror system may be configured to direct an external light source incident on the stationary sample stage. An additional aspect may include that the mirror system may further comprise a fiber positioned beneath the material and fed through the stationary sample stage such that the stationary stage may be configured to photo-excite the sample from the opposite end.

Moreover, in some embodiments, the apparatus may further comprise an X-Y micro-positioning stage, such that the X-Y micro-positioning stage is mechanically engaged with the stationary sample stage configured to traverse the stationary sample stage along an x axis and a y axis.

In some embodiments, the apparatus may further comprise a base plate such that the base plate is configured to secure the apparatus to a surface. Additionally, the apparatus may further comprise a small fiber-input spectrometer mounted onto the boom arm. In some embodiments, there is at least one detector for capturing data within the sensor comprises at least one of a digital camera, photodiode, phototransistor, pyroelectric, or thermopile.

In some embodiments, the sensor attachment mounted to the tube assembly may be configured to be manipulable about an x axis, y axis, and z axis.

In some embodiments, the stationary sample stage may consist of a piezoelectric cooling stage, temperature-controlled stage, thermoelectric cooling stage, or a cryogenic cooling stage.

Furthermore, an additional aspect of the present disclosure pertains to a method for scanning the spectrum of an emissive material, the method comprising: (a) providing an apparatus for scanning properties of material, the apparatus comprising: (i) a stationary sample stage that may be configured to support a material in a fixed position; (ii) a first motor that may operatively connect to a rotation stage, the first motor may be configured to rotate the rotation stage about a first axis to scan the material along an azimuthal angle; (iii) a second motor that may be mounted on the rotation stage, the second motor may be configured to rotate about a second axis, perpendicular to the first axis, to scan the material along a polar angle; a boom arm that may attach to the second motor, the boom arm may extend away from the jib arm and support an optical system directed toward the sample stage; (iv) an optical system that may comprise a tube assembly to secure adjustable imaging lenses and optical filters, the tube assembly may be positioned to collect radiation from the material; (v) a sensor attachment that may be mounted on the tube assembly, the sensor attachment may be configured to connect to at least one detector for capturing data related to the material; and (vi) a control system that may be configured to operate the first and second motors, that may allow for coordinated rotation of the rotation stage and boom arm such that it may enable scanning of the material across a range of azimuthal and polar angles; (b) coupling an external light source to be utilized to excite the emissive material; (c) capturing a dark spectrum, such that the apparatus for scanning properties of material may be configured to record a baseline measurement without any incident light on the emissive material; (d) collecting a spectrum data, such that the apparatus for scanning properties of material may be configured to record the spectrum data from the sample at the current azimuth and polar angle settings; (e) adjusting the apparatus for scanning properties of material until the maximum azimuth angle has been reached; and (f) adjusting the apparatus for scanning properties of material until the maximum polar angle has been reached.

In some embodiments, the apparatus for scanning properties of material may comprise a horizontal jib arm such that the first motor operatively connected to a horizontal jib arm, the first motor may be configured to rotate the jib arm about a first axis to scan the material along an azimuthal angle, such that the second motor is mounted to the horizontal jib arm.

In some embodiments, the method may further comprise the step of, coupling an external light source to excite the emissive material. Furthermore, the method may further comprise the step of, opening a shutter concealing the light source, such that the light source may illuminate the emissive material. In some embodiments, the method may further comprise the step of, closing the shutter such that the apparatus for scanning properties of material may proceed to capture the dark spectrum.

In some embodiments, the method may further comprise the step of, moving the apparatus for scanning properties of material by at least one predetermined increment if the maximum azimuth angle has not been reached. Moreover, in some embodiments, the method may further comprise the step of, moving the apparatus for scanning properties of material by at least one predetermined increment if the maximum polar angle has not been reached.

In some embodiments, the method may further comprise the step of, compiling the collected data into a file to prepare it for output.

Furthermore, in some embodiments, the method may further comprise the step of, returning the apparatus for scanning properties of material to its original position.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 14B is a graphical exemplification of a light spectrum of LED collected by an optimized scanning apparatus using an LED scanner at a 50-degree position.

DETAILED DESCRIPTION OF THE PREFERRED EMBODIMENT

Figure 1:
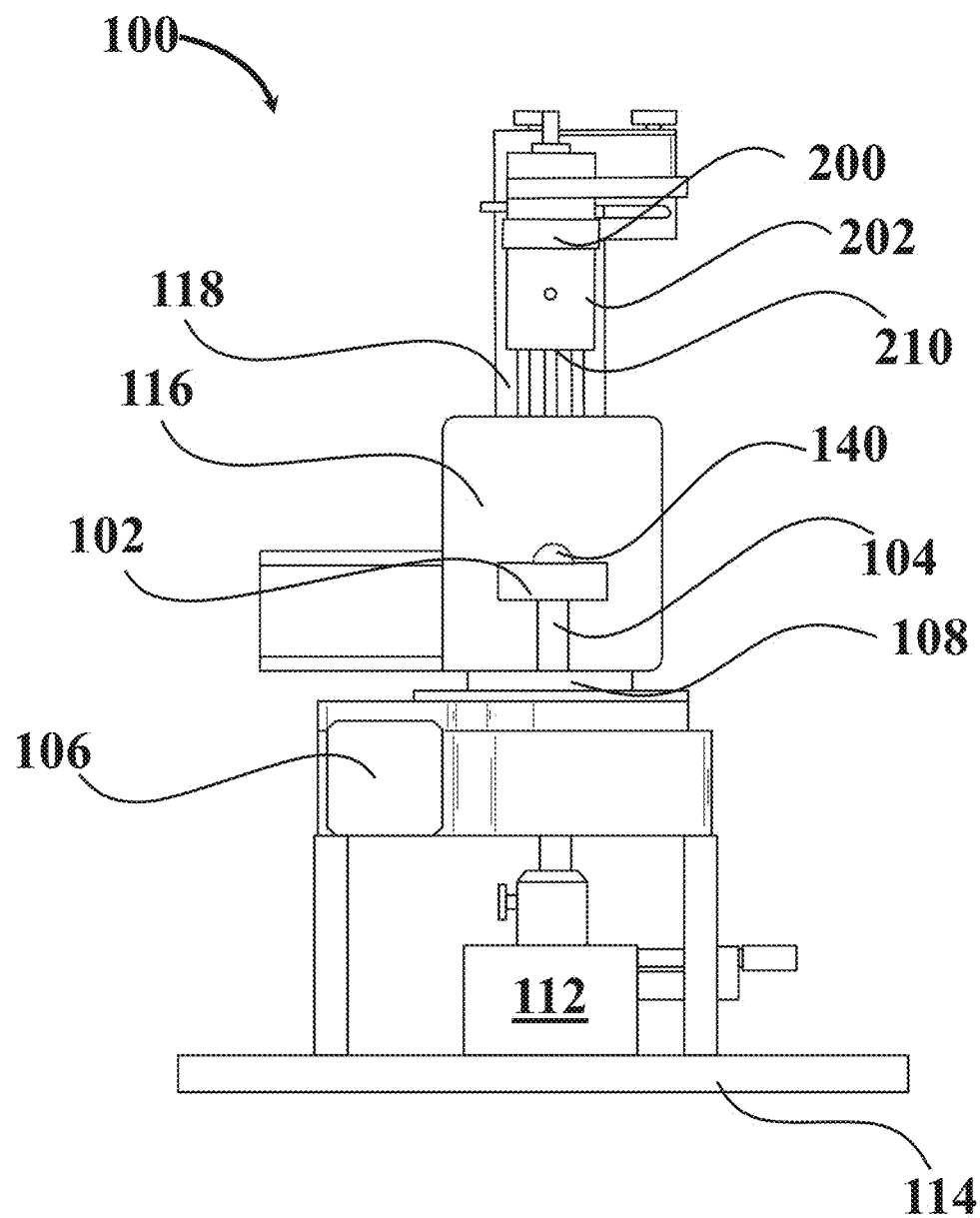
FIG. 1 is a graphical illustration depicting an elevated right-side view of an exemplary embodiment of an optimized scanning apparatus, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Apparatus for Scanning the Spectrum of an Emissive Material

The present disclosure pertains to an apparatus for scanning the spectrum of an emissive material (hereinafter "optimized measurement apparatus") that may be implemented to measure the optical properties of an emissive material. The optimized measurement apparatus may comprise of a stationary sample stage and a dual-axis rotational system. Such that the stationary sample stage maintains its position while the dual-axis rotational system may support an optical system such that the optical system may collect data from different angles along polar and azimuth coordinates. The dual-axis rotational system may further comprise motors to allow for movement of the optical system along the polar and azimuth coordinates. The optical system may comprise a plurality of sensors that may detect and collect data concerning different optical properties of an emissive material. The optimized measurement apparatus will be described in greater detail in the sections herein below.

As such, FIG. 1 depicts an optimized scanning apparatus 100, according to an embodiment of the present disclosure. In this embodiment, optimized scanning apparatus 100 (i.e., the apparatus for scanning the spectrum of an emissive material) may comprise stationary sample stage 102 such that it may be mechanically coupled with pipe 104 to secure stationary sample stage 102 such that stationary sample stage does not rotate or move. Pipe 104 may further be configured to X-Y micro-positioning stage 112 so that X-Y micro-positioning stage 112 is mechanically engaged with stationary sample stage 102 through pipe 104 such that X-Y micro-positioning stage 112 may be configured to traverse stationary sample stage 102 along an x-axis and a y-axis to allow for easier of alignment of stationary sample stage with rear filter housing 200. Pipe 104 may further comprise a cavity to allow for a fiber 140 that may be positioned within the cavity to allow for illumination of stationary sample stage 102 beneath the base of stationary sample stage 102.

Figure 11:
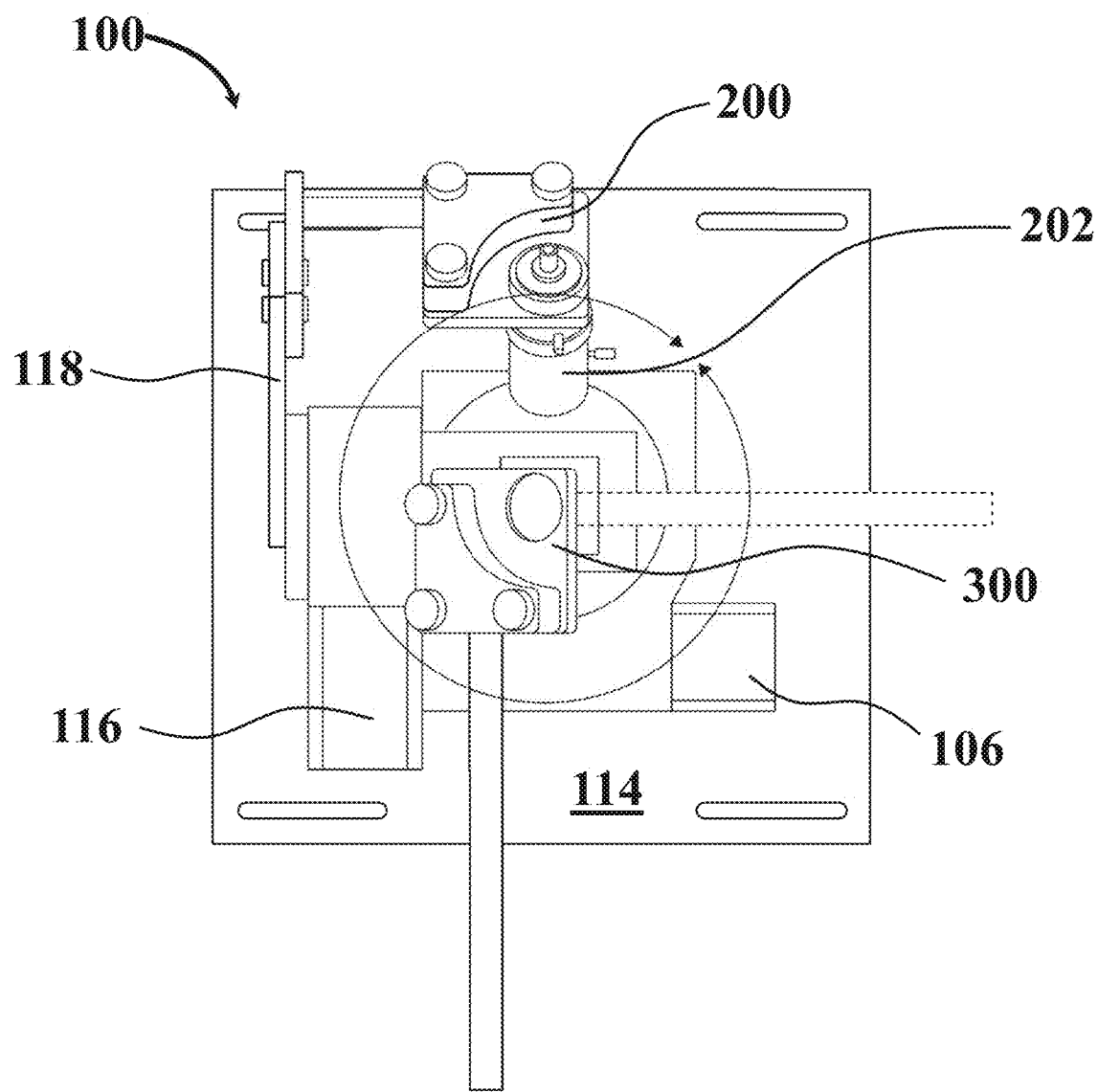
FIG. 11 is a graphical illustration depicting a top-down view of an optimized scanning apparatus incorporating the mirror system, according to an embodiment of the present disclosure.
Figure 12:
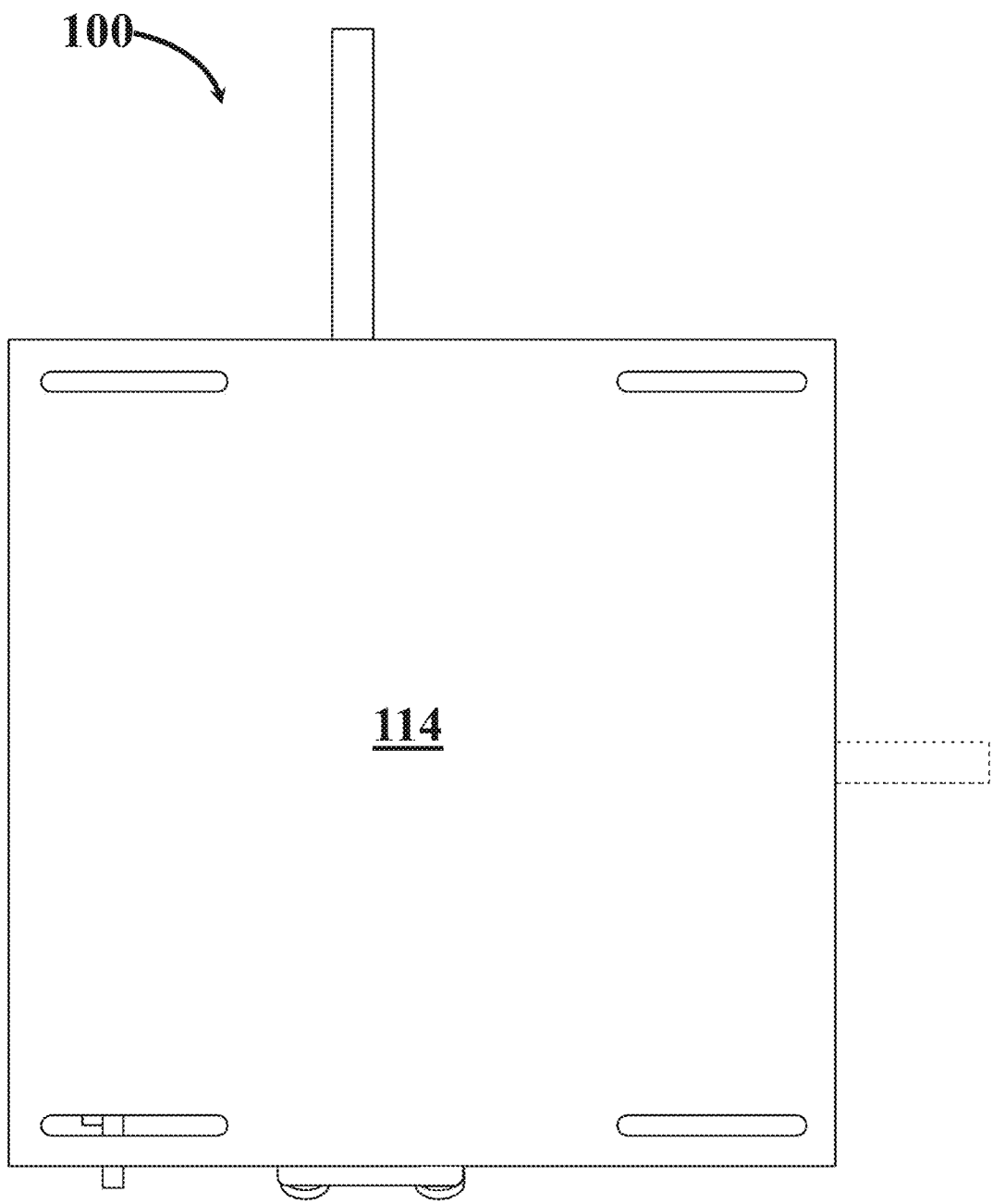
FIG. 12 is a graphical illustration depicting a bottom-up view of an optimized scanning apparatus, according to an embodiment of the present disclosure.
Figure 13A:
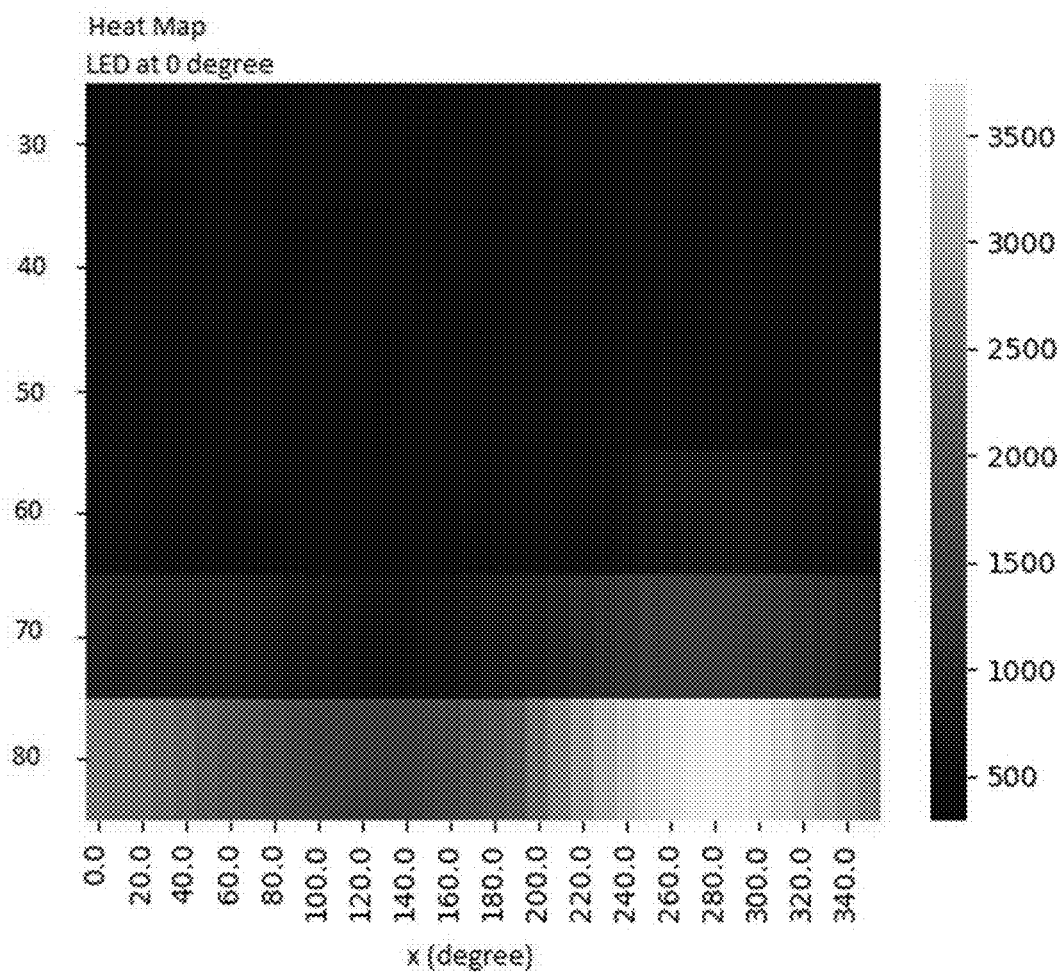
FIG. 13A is a graphical exemplification of a heat map collected by an optimized scanning apparatus using an LED scanner at a 0-degree position.
Figure 13B:
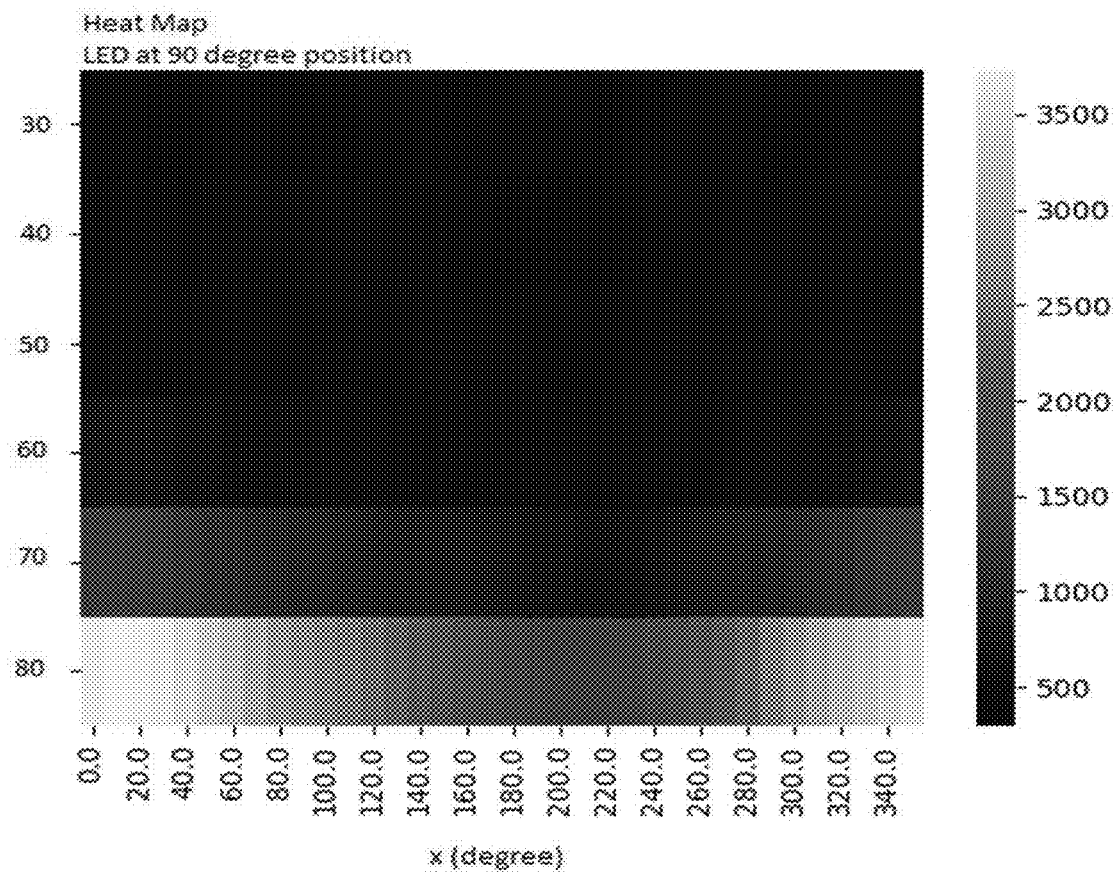
FIG. 13B is a graphical exemplification of a heat map collected by an optimized scanning apparatus using an LED scanner at a 90-degree position.
Figure 13C:
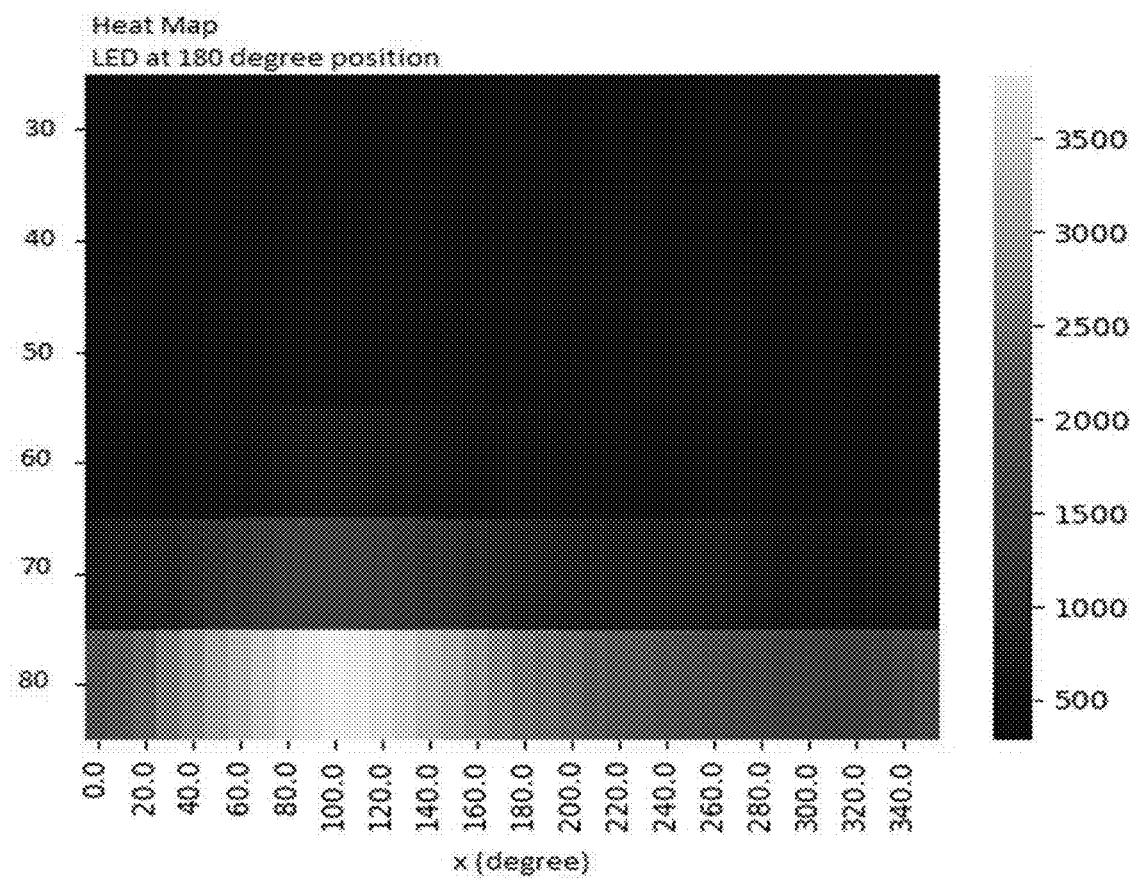
FIG. 13C is a graphical exemplification of a heat map collected by an optimized scanning apparatus using an LED scanner at a 180-degree position.
Figure 13D:
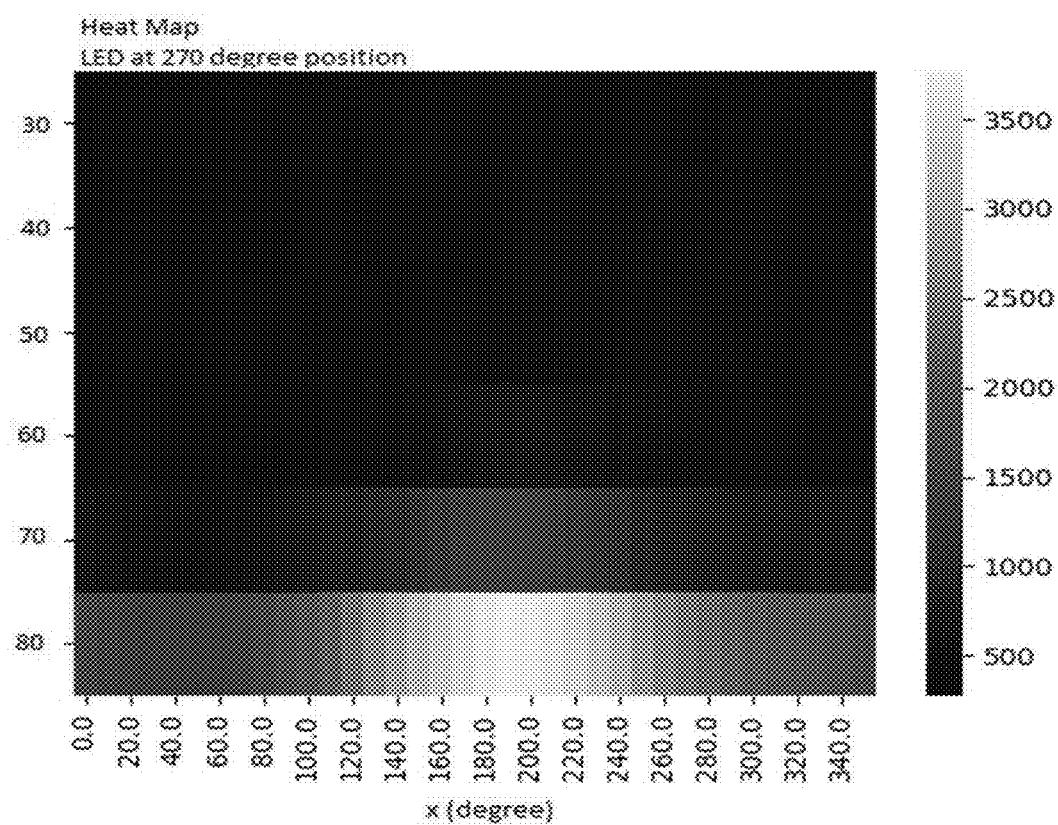
FIG. 13D is a graphical exemplification of a heat map collected by an optimized scanning apparatus using an LED scanner at a 270-degree position.
Figure 13B:
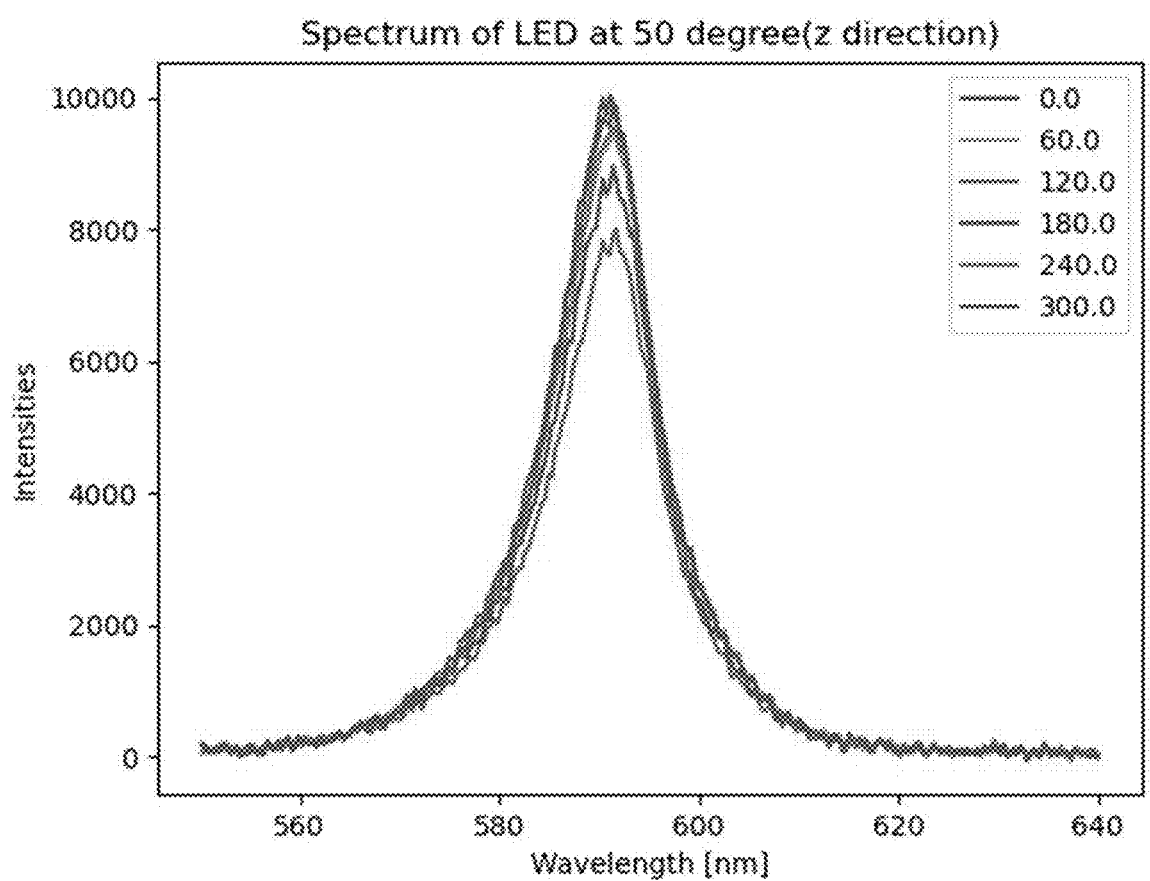

Referring again to FIG. 1, in conjunction with FIG. 2 and FIGS. 5-11, in an embodiment, optimized scanning apparatus 100 may further comprise a first motor 106 that may be operatively connected to a horizontal jib arm 108 (as shown in particular in FIG. 6) such that first motor 106 may be configured to rotate horizontal jib arm 108 about a first axis such that scanning may be allowed along an azimuthal angle (as shown in particular in FIG. 11). Optimized scanning apparatus 100 may further comprise a second motor 116 that may be mounted onto horizontal jib arm 108. Second motor 116 may be configured to rotate about a second axis that may be perpendicular to the axis first motor 106 may rotate about to allow for scanning of a material along a polar angle (as shown in particular in FIG. 8). An embodiment of optimized scanning apparatus 100 may further comprise a boom arm 118 that is mechanically connected to second motor 116. Boom arm 118 may extend away from horizontal jib arm 108 and may support an optical system 200. Optical system 200 may be oriented toward stationary sample stage 102.

Figure 2:
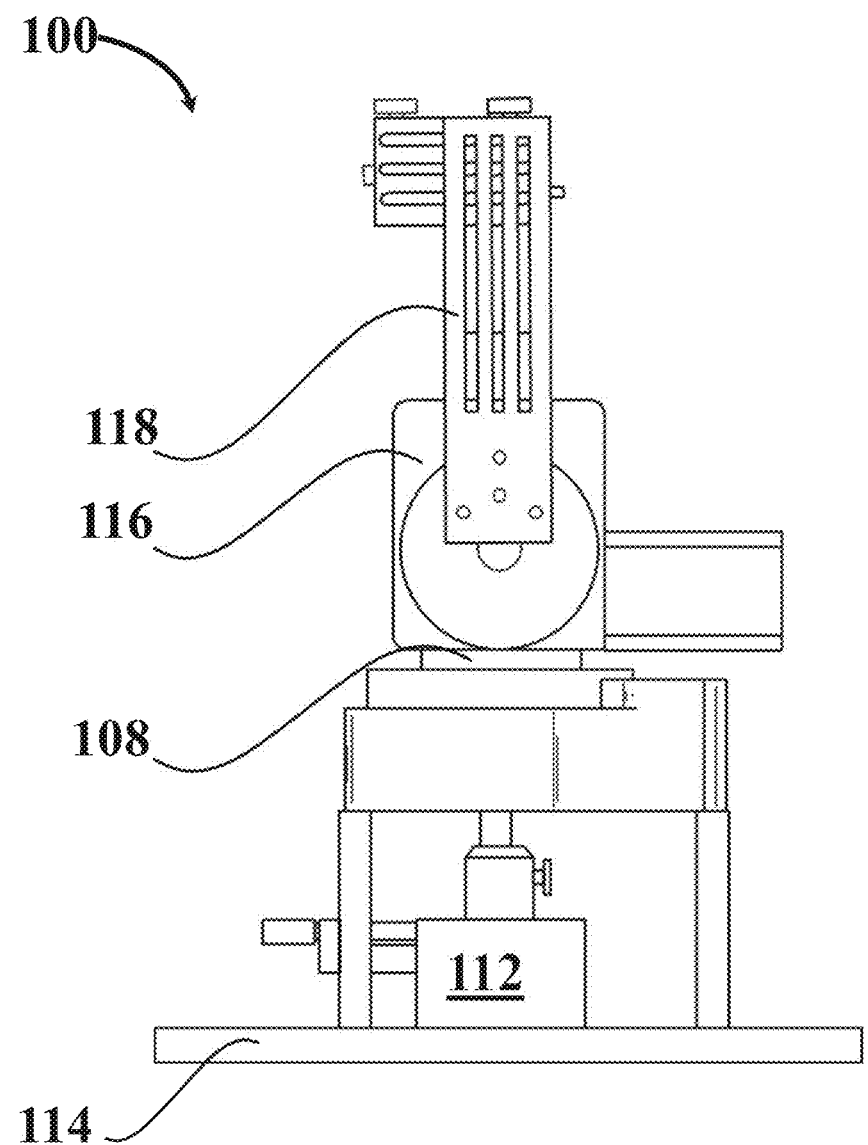
FIG. 2 is a graphical illustration depicting an elevated left-side view of an optimized scanning apparatus of FIG. 1, according to an embodiment of the present disclosure.
Figure 4:
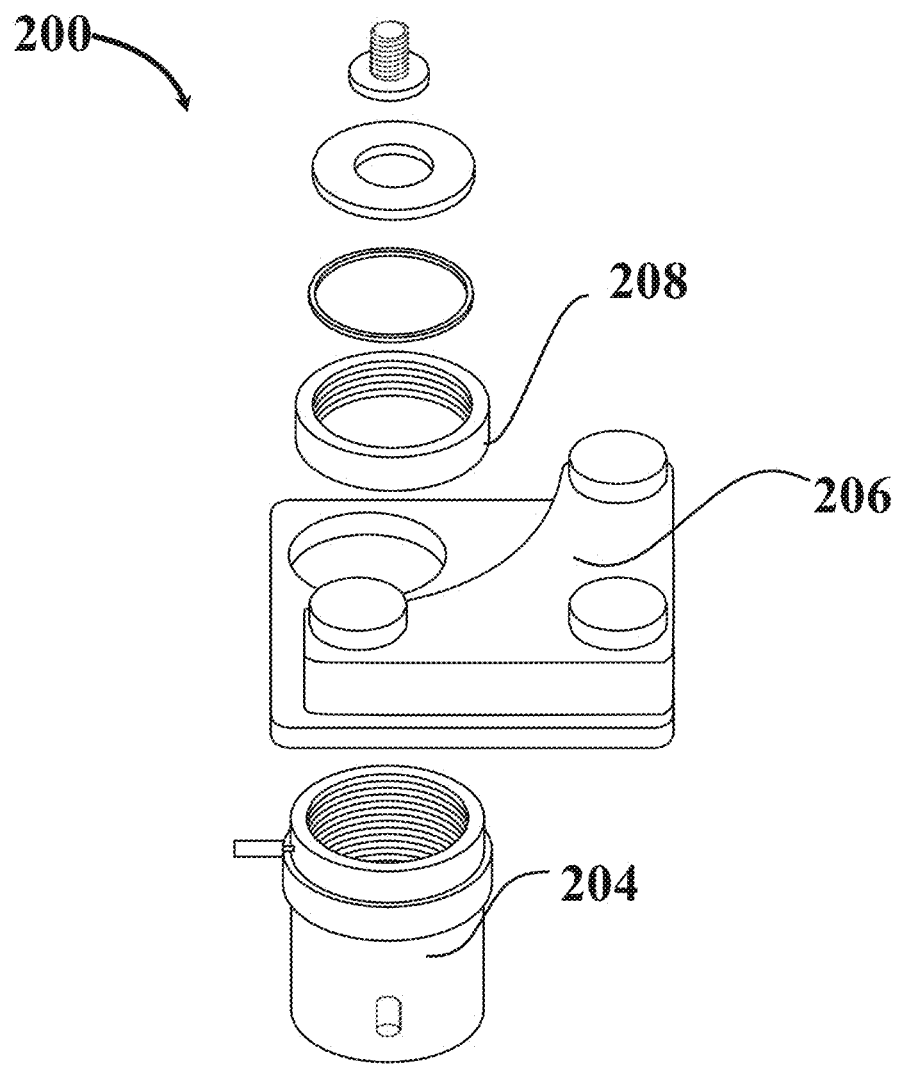
FIG. 4 is a graphical illustration depicting an exploded view of a rear filter housing and a sensor attachment of an optimized scanning apparatus, according to an embodiment of the present disclosure.

Moreover, as shown in FIG. 4, in conjunction with FIGS. 1-2, optical system 200 may further comprise a tube assembly 206. Optical system 200 may comprise a rear filter housing 204 such that tube assembly 206 may contain and store a sensor and house a sensor within tube assembly 206 within a rear filter housing 204. Additionally, tube assembly 206 may further comprise a housing mechanism 208 such that housing mechanism 208 may assist in securing and holding a sensor within tube assembly 206 of optical system 200. The sensor may be configured to connect to at least one detector 210 for capturing data related to the material. In an embodiment, sensor attachment 202 may be configured to mechanically connect with at least one detector 210 (as shown in FIG. 1 in particular) for capturing data. Sensor attachment 202 may be mounted to tube assembly 206 such that sensor attachment 202 is configured to be manipulatable about an x-axis, y-axis, and z-axis. The detector 210 may comprise at least one of a digital camera, photodiode, spectrometer, phototransistor, pyroelectric, or thermopile. Detector 210 is configured to collect data concerning the optical properties emitting from the emissive material placed on stationary sample stage 102.

Referring again to FIG. 1, in conjunction with FIG. 2 and FIGS. 5-12, in an embodiment, optimized scanning apparatus 100 may further comprise a control system that may be communicatively coupled to first motor 106 and second motor 116. The control system may be configured to transmit an electrical signal to first motor 106 and second motor 116 to rotate horizontal jib arm 108 and boom arm 118 to enable optimized scanning apparatus 100 to scan the material across a range of azimuthal and polar angles. In an embodiment, optimized scanning apparatus 100 may further comprise a static pump polarization system. Such that the static pump polarization system may be configured to maintain the orientation of a linearly polarized excitation source during the scanning process.

Figure 5:
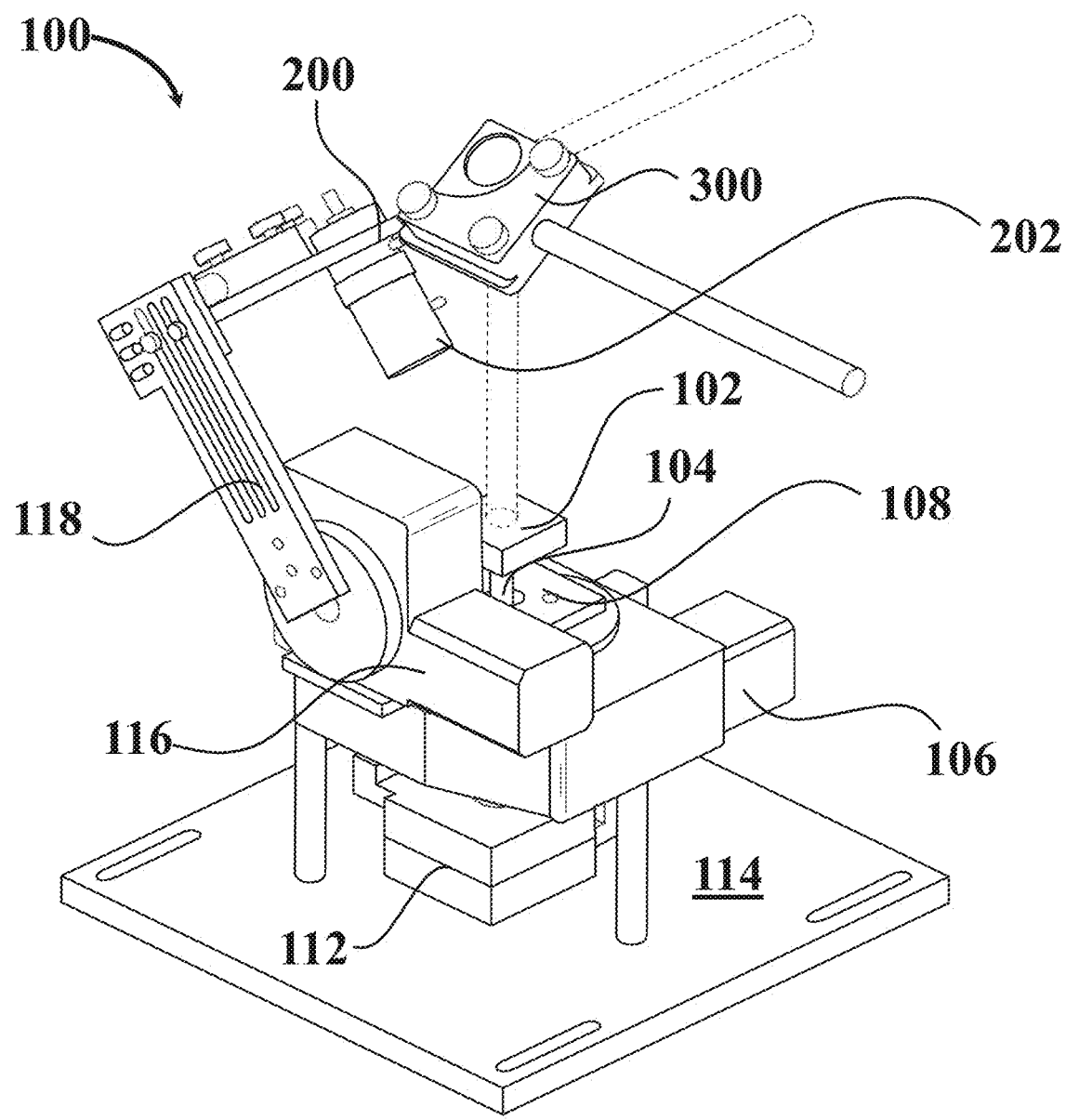
FIG. 5 is a graphical illustration depicting a rear side, isometric view of an alternative exemplary embodiment of an optimized scanning apparatus comprising a mirror system, according to an embodiment of the present disclosure.
Figure 6:
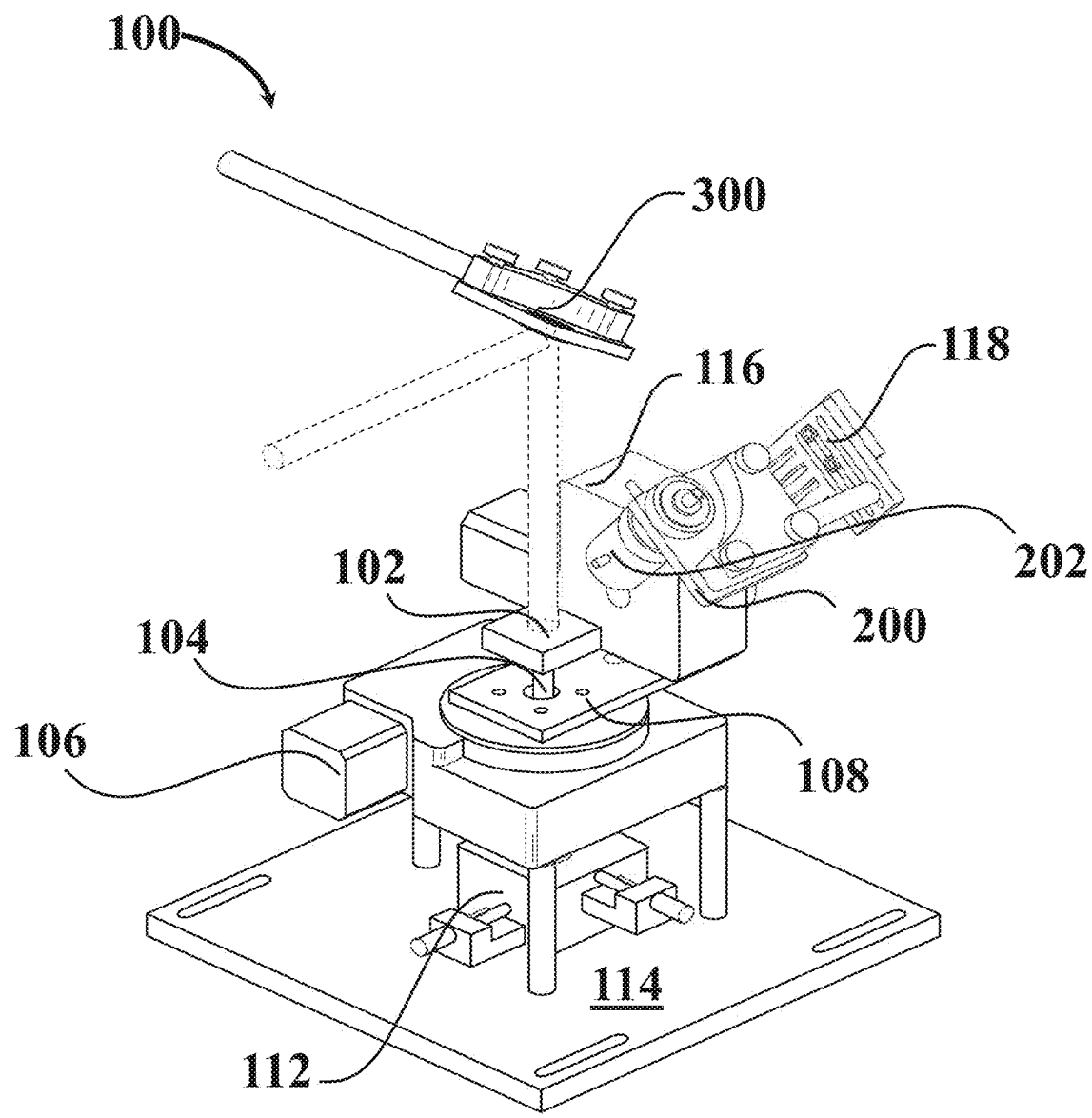
FIG. 6 is a graphical illustration depicting a front, isometric view of an optimized scanning apparatus of FIG. 5, according to an embodiment of the present disclosure.
Figure 7:
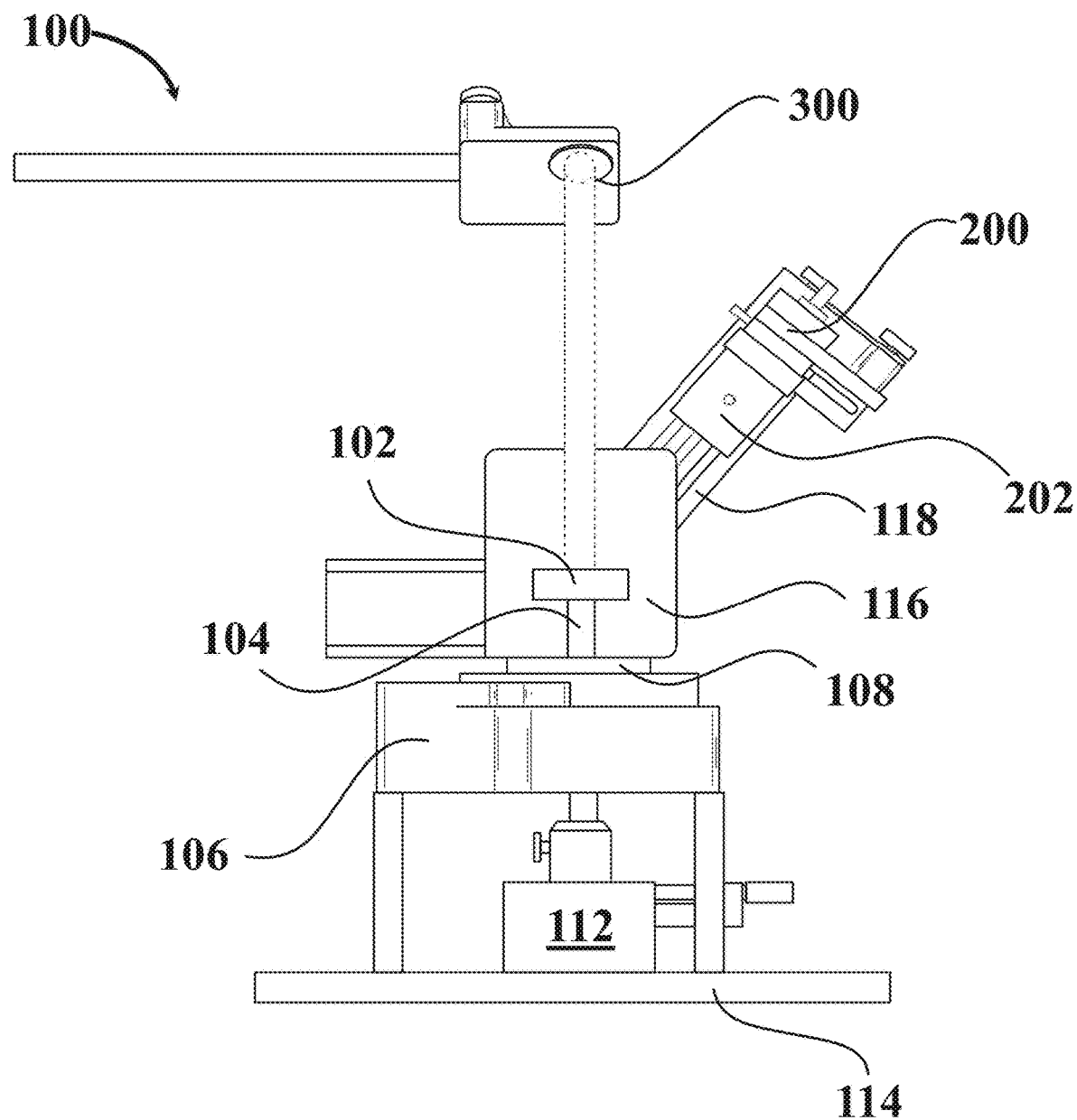
FIG. 7 is a graphical illustration depicting an elevated rear view of an optimized scanning apparatus of FIG. 5, according to an embodiment of the present disclosure.
Figure 8:
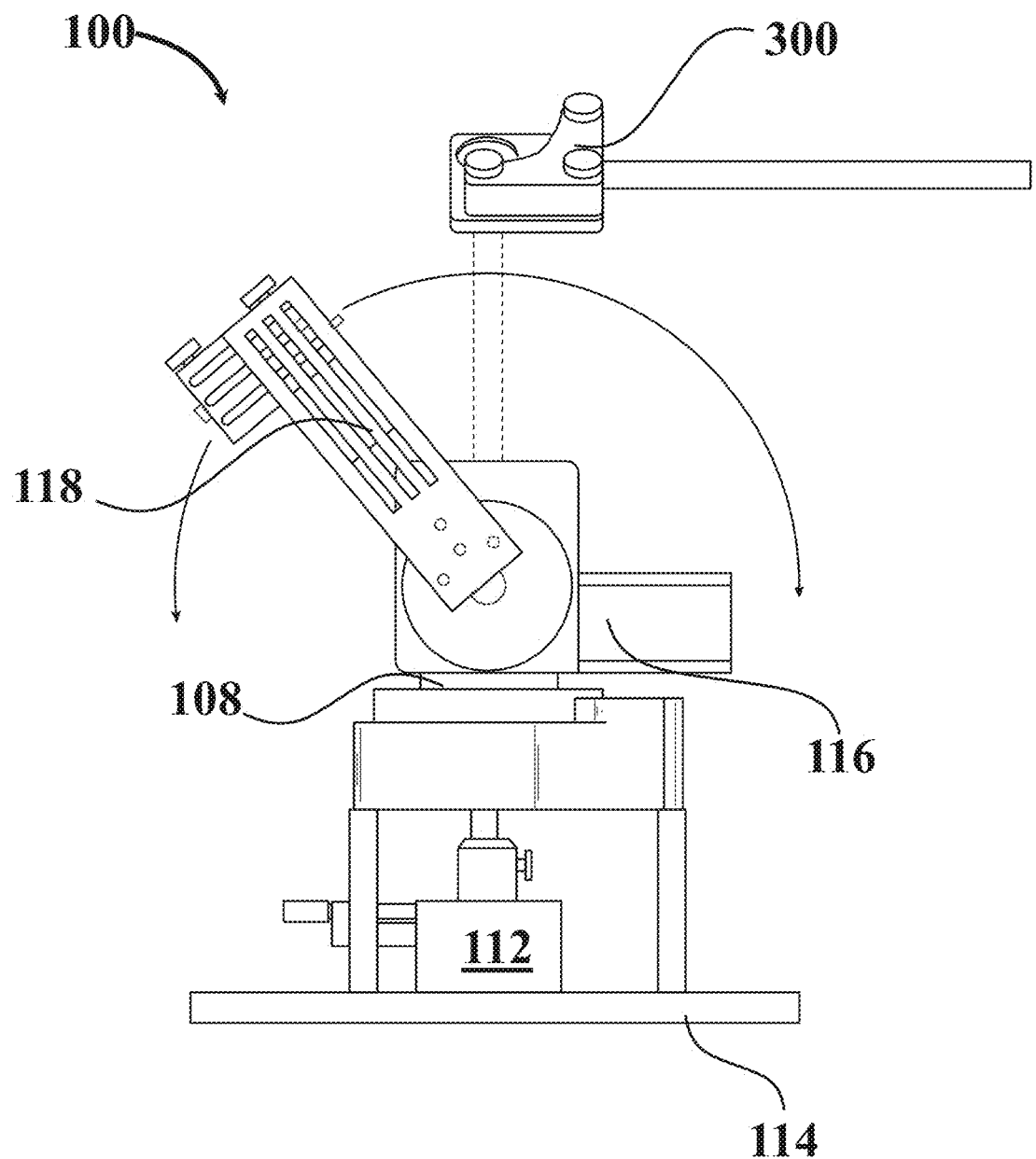
FIG. 8 is a graphical illustration depicting an elevated side view of an optimized scanning apparatus incorporating the mirror system, according to an embodiment of the present disclosure.
Figure 9:
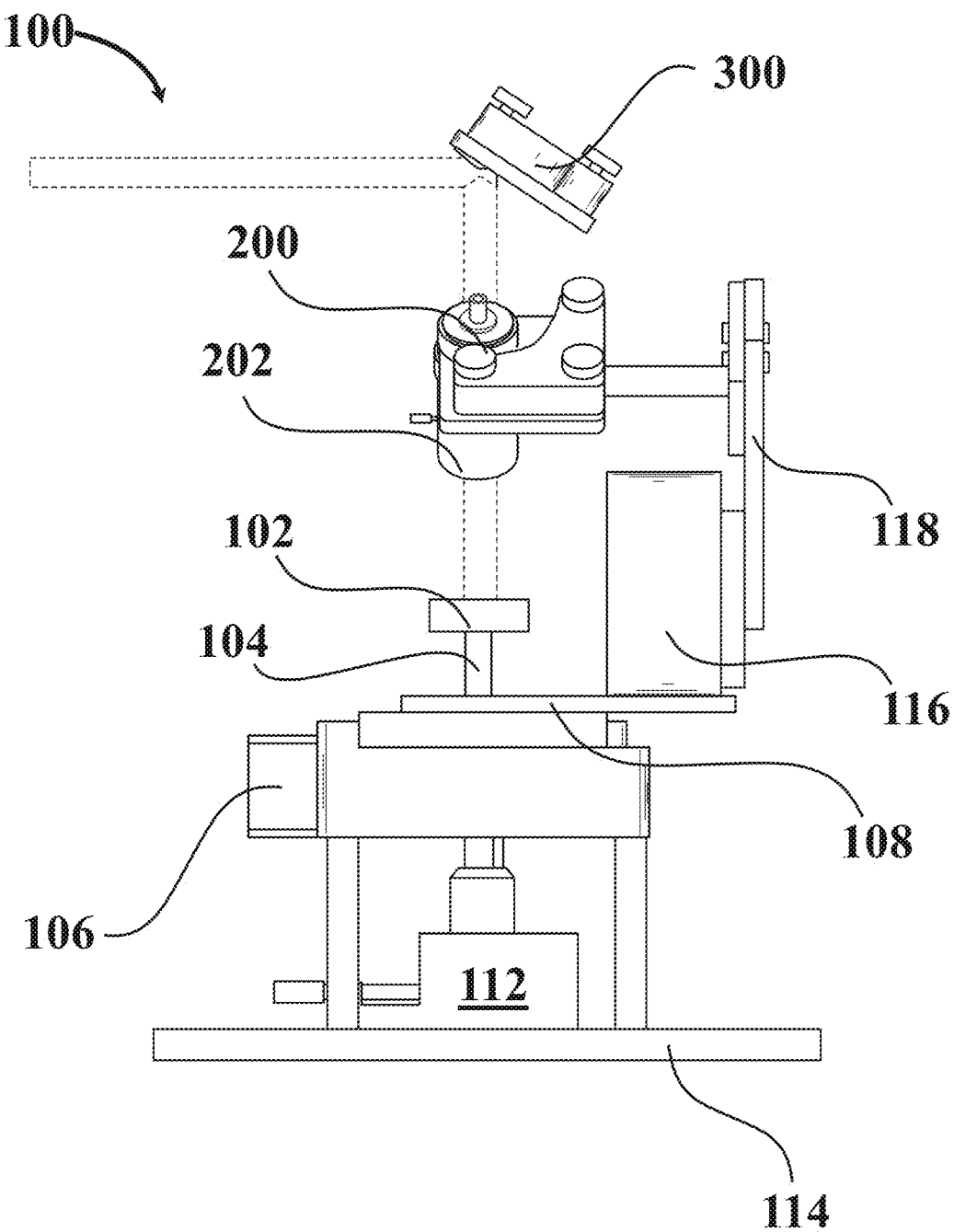
FIG. 9 is a graphical illustration depicting an elevated side view of an optimized scanning apparatus incorporating the mirror system, according to an embodiment of the present disclosure.
Figure 10:
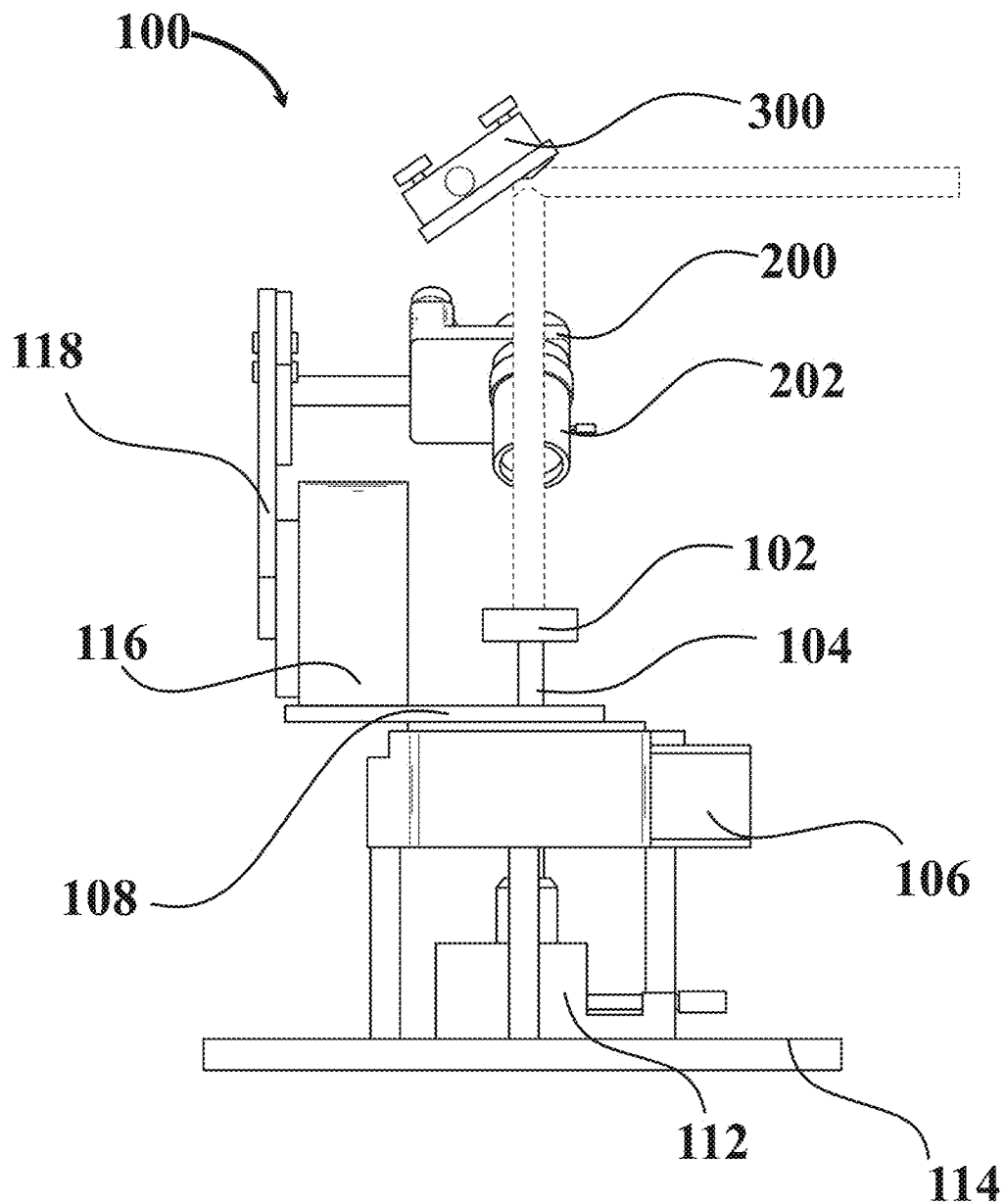
FIG. 10 is a graphical illustration depicting an elevated side view of an optimized scanning apparatus incorporating the mirror system according to an embodiment of the present disclosure.

As shown in FIG. 5, in conjunction with FIGS. 6-11, optimized measurement apparatus may further comprise a mirror system 300 such that mirror system 300 may be positioned vertically over stationary stage 102. Mirror system 300 may be configured to direct an external light source incident on stationary sample stage 102. Mirror system 300 may also be configured to further comprise fiber 140 that may be positioned underneath stationary stage 102 and emit an external light source incident on stationary sample stage 102.

Figure 3:
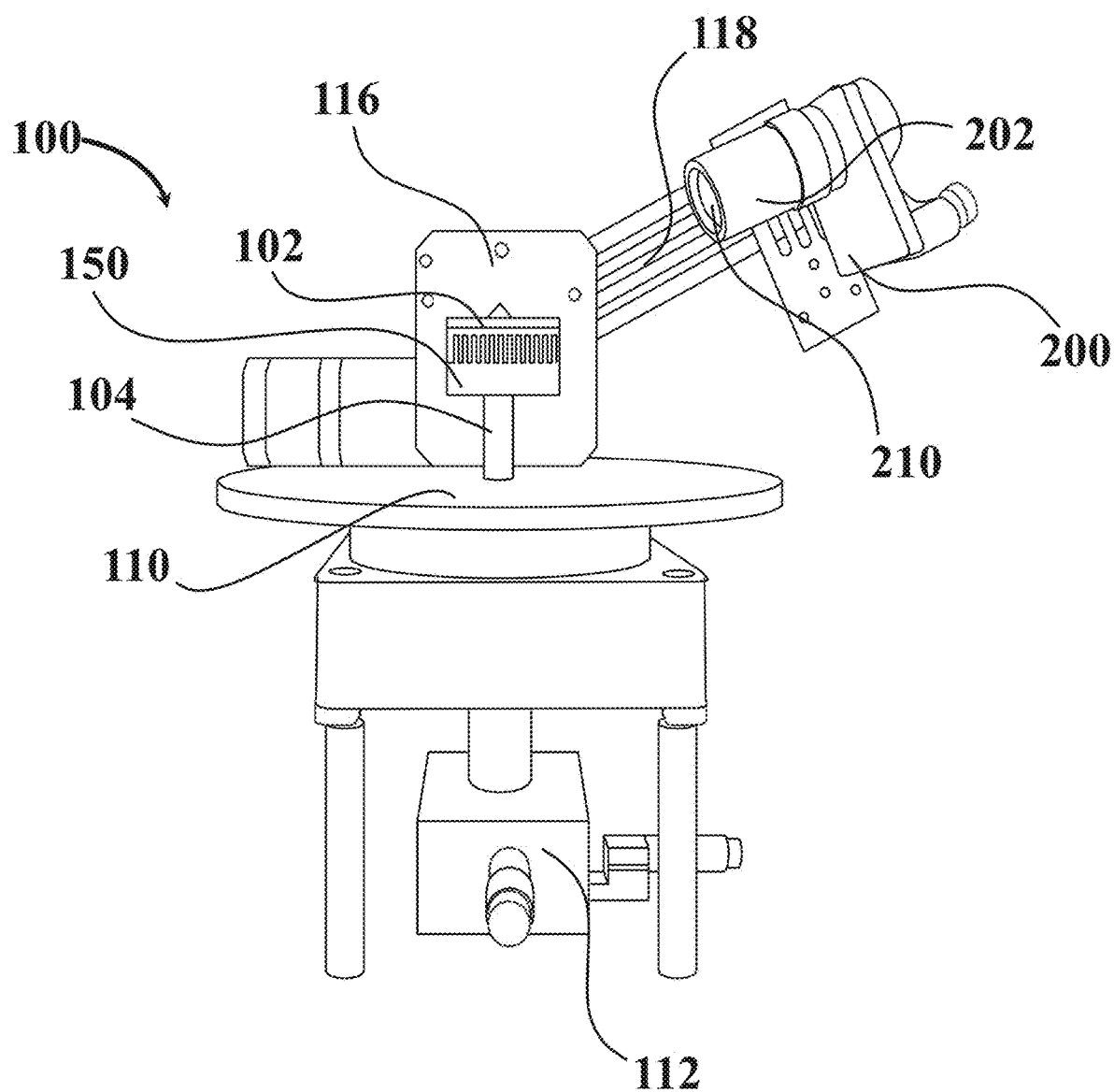
FIG. 3 is a graphical illustration depicting an elevated, perspective front view of an optimized scanning apparatus, according to an embodiment of the present disclosure.

Another aspect of the present disclosure is that stationary sample stage 102 may further comprise of different sample stages which can assist cooling the sample. As shown in FIG. 3, stationary sample stage 102 further comprises a piezo-cooled sample stage 150. Non-limiting examples which sample stage 102 may comprise includes at least one of a piezoelectric cooling stage, temperature-controlled stage, thermoelectric cooling stage, or a cryogenic cooling stage. Stationary sample stage 102 may be configured to include a sample stage that may assist in providing fine adjustments and remove heat from a sample to ensure accurate recording of data measurements.

In an embodiment, as shown in FIG. 3, optimized measurement apparatus 100 may comprise a stationary sample stage 102. Optimized measurement apparatus 100 may also comprise a rotation stage 110 that may be operatively connected to first motor 106. First motor 106 may be configured to rotate rotation stage 110 about a first axis to scan the material about an azimuthal angle. Second motor 116 may be configured to be mounted onto rotation stage 110 directly. Second motor 116 may be configured to rotate about a second axis to allow for scanning of the material about a polar angle. Boom arm 118 can support optical system 200 directed toward sample stage 102.

Referring again to FIG. 3, rotation stage 110 may further comprise a central boring such that stationary sample 102 stage may extend through the central boring of rotation stage 110 without coming into contract with the sides of rotation stage 110. Base mount 112 is in mechanical communication with stationary sample stage 102 such that base mount 112 may translate stationary sample stage 102 along an x-axis and a y-axis. In an embodiment, optimized measurement apparatus may further comprise a spectrometer that may be mounted onto the boom arm 118 such that spectrometer may be able to measure wavelengths of electromagnetic radiation which has interacted with the emissive sample.

Referring to FIGS. 13A-13D, in conjunction with FIGS. 14A-14D, in an embodiment, optimized measurement apparatus 100 may be configured to collect a range of optical properties from the emissive material. Optimized measurement apparatus 100 can be configured to attach a detector 210 to sensor attachment 202 to collect data regarding the spatial distribution of light intensity in the emissive material. Non-limiting examples of the data collection may include heat maps, as shown in FIGS. 13A-13D. Optimized measurement apparatus 100 may store the collected data in the form of data cube, such that the data can be stored in spherical coordinates for full angular scans.

In addition, in an embodiment, optimized measurement apparatus 100 may also be configured to collect a spectrum of a light-emitting diode. In this manner, optimized measurement apparatus 100 may collect the spectrum of the light-emitting diode at a plurality of variable positions and/or angles, as show in FIGS. 14A-14D. As such, in this embodiment, during spectrum collection, via the light-emitting diode, of the emissive material, the control system communicatively coupled to first motor 106 and/or second motor 116 can move the sensor attachment 202 to the at least one predetermined position and/or angle of the plurality of variable positions and/or angles. In some embodiments, the control system may be configured to transmit an electrical signal to first motor 106 and/or second motor 116, such that optimized measurement apparatus 100, in tandem with detector 210, such that detector 210 may collect and/or record a 360-degree spectrum of the emissive material.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

Method of Use

Figure 15:
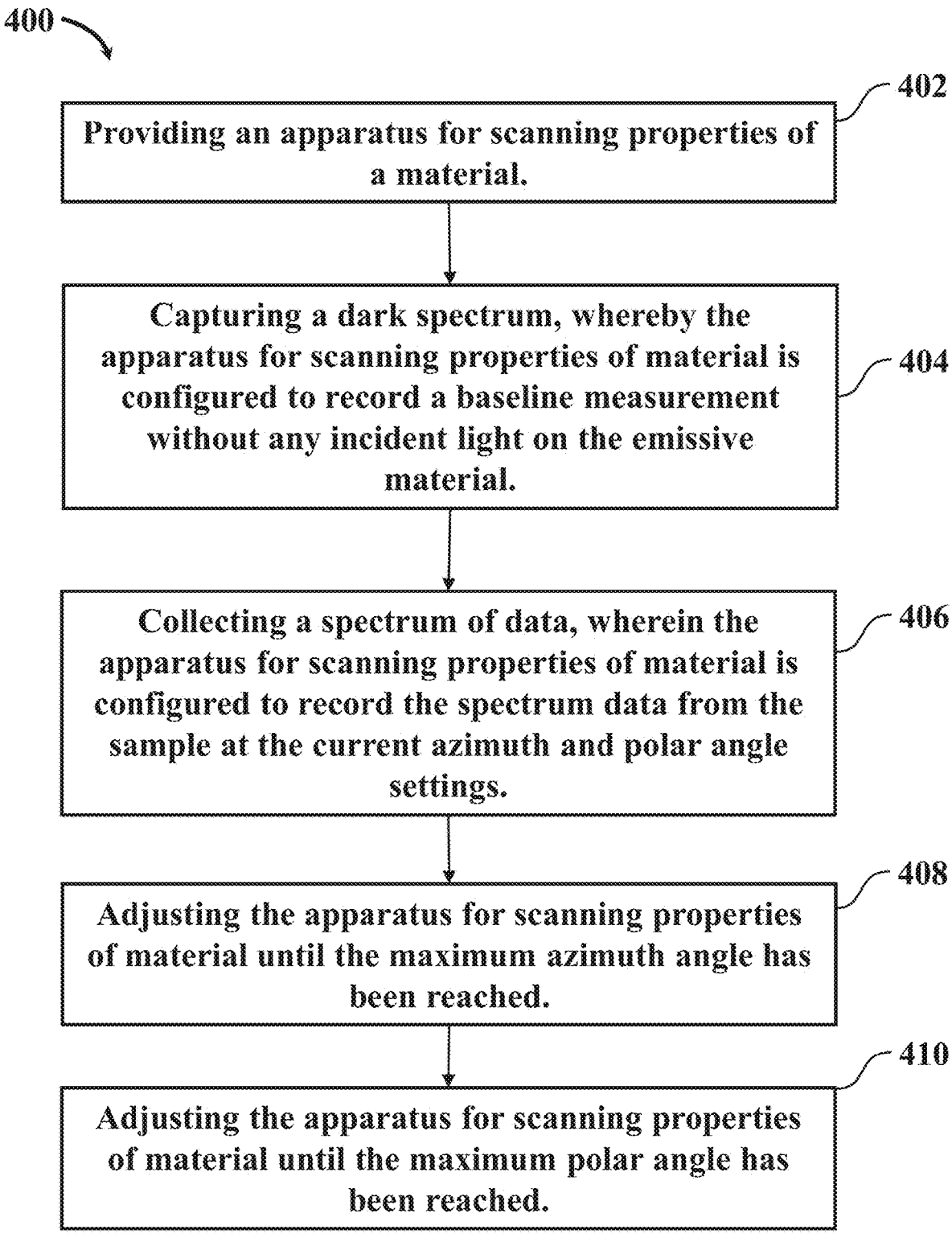
FIG. 15 is a flow chart depicting the steps of a method for scanning the spectrum of an emissive material, according to an embodiment of the present disclosure.

Referring now to FIG. 15, in conjunction with FIGS. 1-12, a method is depicted for scanning the spectrum of an emissive material via optimized measurement apparatus 100. The steps delineated are merely exemplary of a preferred order for scanning the spectrum of an emissive material via optimized measurement apparatus 100. The steps may be carried out in another order, with or without additional steps included therein. Additionally, the steps may be carried out with alternative embodiments of optimized measurement apparatus 100, as contemplated in the above description.

As shown in FIG. 15, in conjunction with FIGS. 1-12, the method for scanning the spectrum of an emissive material via optimized measurement apparatus 100 begins with step 402, providing an apparatus for scanning properties of a material. Moreover, the apparatus for scanning properties of a material 100 may further comprise a horizontal jib arm such that the first motor may operatively connect to a horizontal jib arm, the first motor may be configured to rotate the jib arm about a first axis to scan the material along an azimuthal angle, such that the second motor is mounted to the horizontal jib arm.

Referring again to FIG. 15, in conjunction with FIGS. 1-12, next, method 400 may proceed to step 404. At step 404, may comprise capture a dark spectrum, such that the apparatus for scanning properties of material may be configured to record a baseline measurement without any incident light on the emissive material. Additionally, an external light source may be coupled to excite the emissive material such that a shutter concealing the light source may be opened so that the light source may illuminate the emissive material. Furthermore, the shutter may be closed such that the optimized measurement apparatus 100 may proceed to capture the dark spectrum.

Referring to FIG. 15, in conjunction with FIGS. 1-12, at the next step, step 406 the optimized measurement apparatus 100 may collect a spectrum of data such that the optimized measurement apparatus 100 may be configured to record the spectrum data from the sample at the current azimuth and polar angle settings. Next, at step 408, the optimized measurement apparatus 100 may be adjusted until the maximum azimuth angle has been reached. In some embodiments when the maximum azimuth angle has not been reached, optimized measurement apparatus 100 may be moved by at least one predetermined increment. Further, and subsequently, at step 410, the optimized measurement apparatus 100 may be further adjusted until the maximum polar angle has been reached. Additionally, in some embodiments when the maximum polar angle has not been reached, optimized measurement apparatus 100 may be moved by at least one predetermined increment.

Furthermore, referring to FIG. 15, in conjunction with FIGS. 1-12, method 400 may further comprise compiling the collected data from the optimized measurement apparatus 100 such that it is prepared for output. Moreover, method 400 may further comprise having the optimized measurement apparatus returned to an original resting position.

Figure 14A:
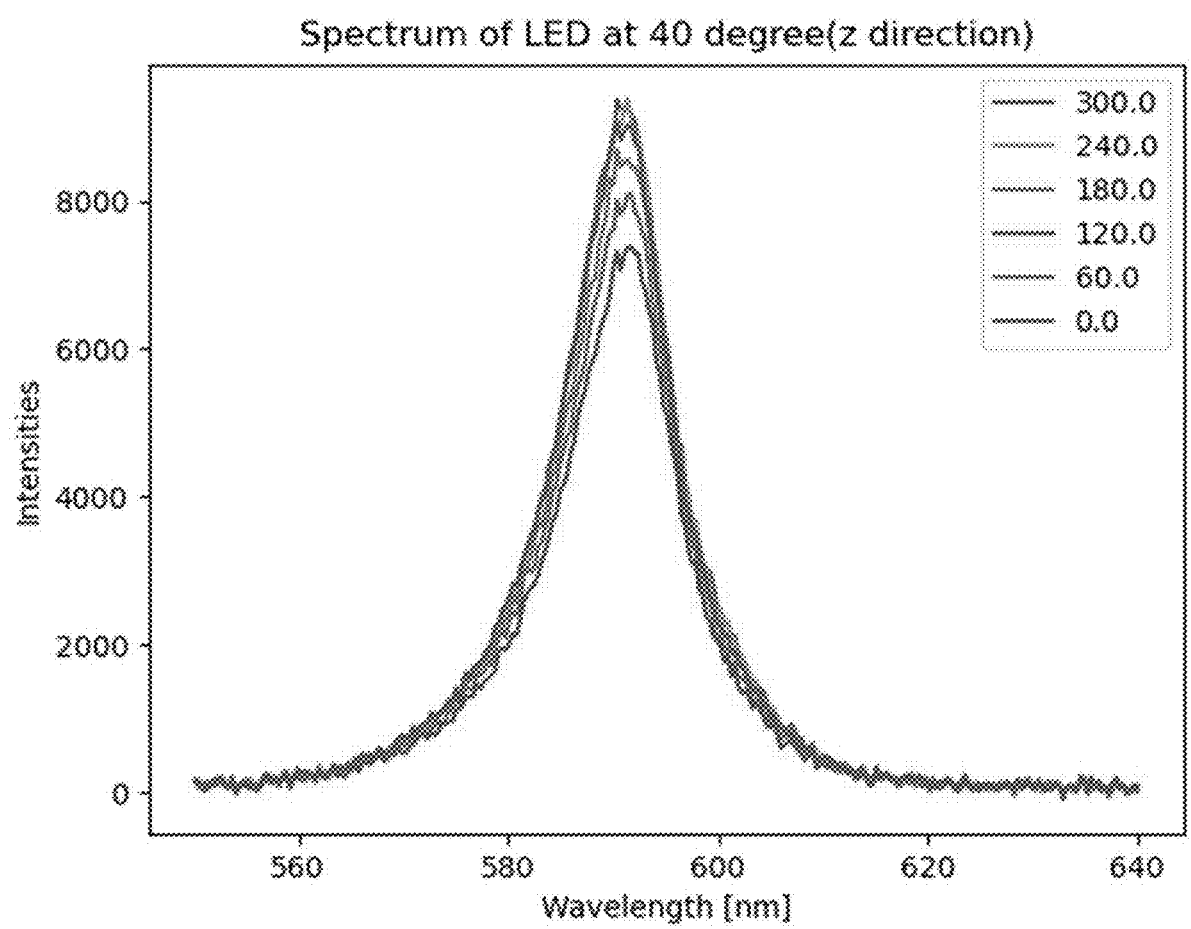
FIG. 14A is a graphical exemplification of a light spectrum of LED collected by an optimized scanning apparatus using an LED scanner at a 40-degree position.
Figure 14C:
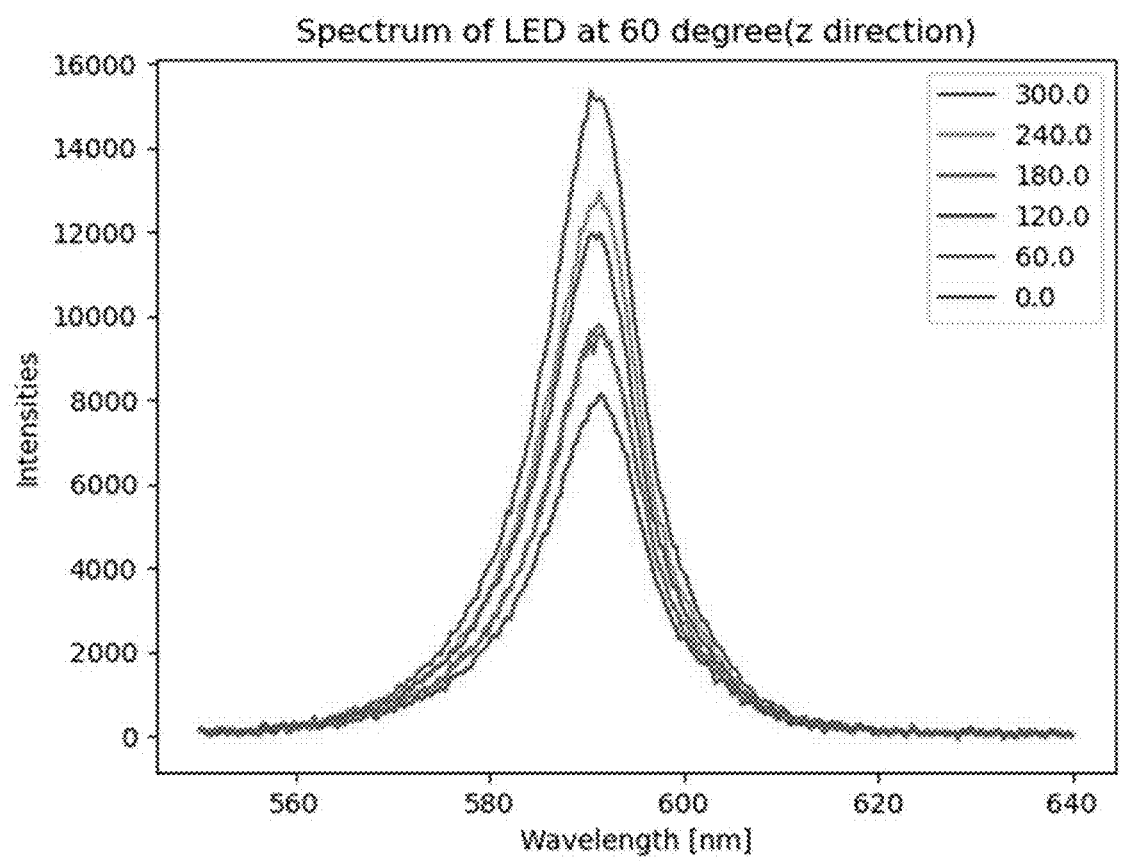
FIG. 14C is a graphical exemplification of a light spectrum of LED collected by an optimized scanning apparatus using an LED scanner at a 60-degree position.
Figure 14D:
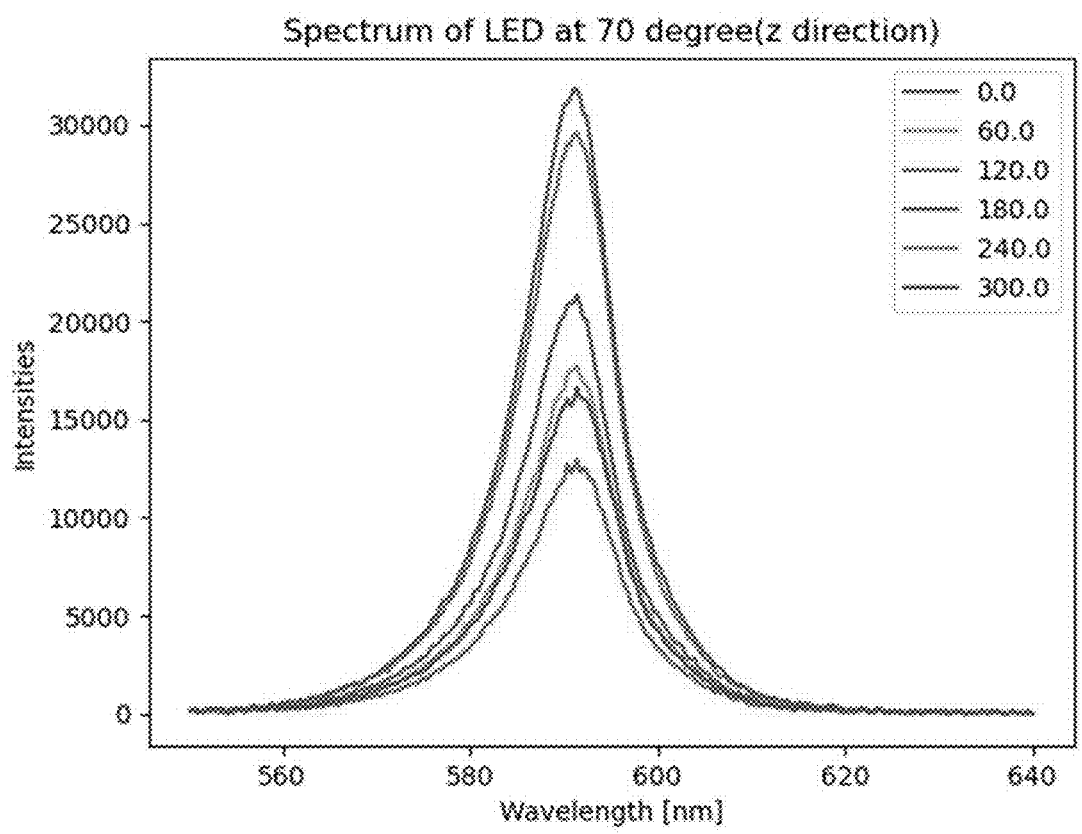
FIG. 14D is a graphical exemplification of a light spectrum of LED collected by an optimized scanning apparatus using an LED scanner at a 70-degree position.

As disclosed in TABLE 1, provided below, is an example of a string of code utilized to implement the optimized measurement apparatus which can store the data as a nested lists file. The code may comprise the key steps of method of use of the optimized measurement apparatus. In this manner, in an embodiment, as shown in TABLE 1, the optimized measurement apparatus may be configured to move the detector to the desired position and collect spectral data from a plurality of spatial positions and angles. In the considered example, as shown in FIGS. 13A-13D, a heat map may be generated after applying the code and following the steps outlined in FIG. 15. Additionally, in an alternative embodiment, spectral data collected by utilizing the code disclosed in TABLE 1 may be visualized in alternative formats such as displaying the light spectrum by an LED at different angles as shown in FIGS. 14-14D.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Azimuthal Angle means the horizontal angular measurement in a spherical coordinate system, typically measured in the plane perpendicular to the polar axis. It is used in the system to describe the rotation of the material about a vertical axis, allowing the scanning system to capture spectral data from different horizontal directions. This angle is essential in characterizing how light interacts with the material from various horizontal perspectives, contributing to the comprehensive angular scanning capability of the system.

Boom Arm means a structural component of the system that supports and positions other elements, such as the detector or lens assembly, in relation to the material being scanned. In the context of this invention, the boom arm is designed to reduce transient losses during scanning by ensuring that the detector and any part of an optical fiber between the light collection end and the detector maintains a stable position throughout the motions of a scan. The boom arm is an integral part of the system's mechanical structure, facilitating precise alignment and movement of optical components.

Collimated Light means a beam of light whose rays are parallel, and therefore, spread minimally as they propagate. In this system, collimated light is used to excite the material being scanned, with the beam directed through a lens or mirror system to ensure that the polarization of the light remains fixed. This characteristic is crucial for achieving consistent excitation across the material, which is necessary for accurate spectral data collection.

Detector means a device or instrument used to sense and measure specific properties of light, such as its intensity, spectrum, or temporal behavior. In this system, the detector is typically an optical spectrometer that captures light emitted or reflected by the material after it has been excited by a pump light source. The detector's role is to collect spectral data across a range of wavelengths, providing the information needed to analyze the material's optical properties.

Emissive Material means a substance or device that emits light, typically as a result of excitation by an external energy source such as electrical current, chemical reactions, or photo-induced processes. In the context of this invention, emissive materials may include LEDs, lasers, or other light-emitting devices. The system is designed to scan the spectral properties of these materials as a function of spherical angles, providing detailed data on how they emit light under various conditions.

Geared Motor means an electric motor equipped with a gearbox that adjusts the motor's output speed and torque. In this system, geared motors are used to control the rotation of the material about the azimuthal and polar angles. These motors provide the precision and control necessary for automated scanning, allowing the system to accurately position the material at various angles for spectral data collection.

Hyperspectral Imaging means a technique that captures and processes information across a wide range of wavelengths. In contrast to traditional imaging, which may capture only three color directs (red, green, and blue), hyperspectral imaging collects data across many narrow spectral bands. In this system, hyperspectral imaging is used to obtain high-resolution spectral data of the material, which is essential for detailed analysis of its optical properties.

Lens System means an assembly of lenses arranged to focus or direct light in a specific manner. In this system, the lens system is used to focus light emitted or reflected by the material onto the detector, ensuring that the captured spectral data is accurate and well-defined. The lens system plays a critical role in the optical alignment and performance of the entire scanning apparatus.

Multimode Optical Fiber means an optical fiber designed to carry multiple modes of light simultaneously, typically used for transmitting light signals over short distances. In this system, a multimode optical fiber may be used to guide light from the material to the detector or to deliver the pump light to the material. The fiber's design allows it to handle various light paths, which is important for maintaining the integrity of the transmitted light during scanning.

Polar Angle means the vertical angular measurement in a spherical coordinate system, typically measured from the polar axis. In this system, the polar angle is used to describe the rotation of the material about a horizontal axis, allowing the scanning system to capture spectral data from different vertical perspectives. This angle is essential in providing a full 3D characterization of how light interacts with the material.

Polarization means the orientation of the electric field of a light wave. In this system, the polarization of the pump light source is fixed relative to the material, ensuring that the excitation of the material is consistent across all scanned angles. Polarization is a key factor in how light interacts with materials, influencing phenomena such as reflection, refraction, absorption, scattering, and emission.

Pump Light Source means the light source used to excite the material in the system. This source emits light with a specific polarization that remains static during scanning. The pump light source is integral to the system's operation, providing the energy required to induce emission or reflection in the material, which is then measured by the detector.

Rotational Stage means a mechanical platform that allows the material or other components to be rotated about a specific axis. In this system, rotational stages are used to enable the azimuthal and polar angle scanning of the material. These stages provide the necessary movement and positioning to ensure that the material can be analyzed from all relevant angles.

Sample Stage means the platform or holder where the material to be scanned is placed. In this system, the sample stage can be adjusted to position the material precisely in relation to the detector and light sources. The sample stage may remain static during scanning, allowing the system's rotating components to perform the necessary angular sweeps.

Spectral Data means the information collected by the detector that represents the intensity of light as a function of wavelength. In this system, spectral data is gathered across a wide range of angles and wavelengths, providing a detailed map of how the material interacts with light. This data is crucial for analyzing the optical properties of the material.

Spectrometer means an optical instrument used to measure properties of light over a specific portion of the electromagnetic spectrum. In this system, the spectrometer is used to analyze light emitted or reflected by the material, capturing detailed spectral data that can be used to characterize the material's optical behavior.

Spherical Angle means the combination of azimuthal and polar angles used to describe the orientation of a point in a spherical coordinate system. In this system, spherical angles are used to define the directions from which the material is scanned. The use of spherical angles allows for a comprehensive analysis of the material's interaction with light from all possible directions.

Transient Losses mean time-dependent changes to reductions in the intensity or quality of light as it travels through a medium, such as optical fibers or lenses. In this system, transient losses are minimized by carefully designing the optical path and mounting components like the detector on a stable boom arm. Reducing transient losses is important for maintaining the accuracy and reliability of the spectral data collected.

Ultraviolet Light means electromagnetic radiation with wavelengths shorter than visible light, typically in the range of 10 nm to 400 nm. In this system, ultraviolet light may be used as part of the pump light source to excite the material. The ability to capture spectral data in the ultraviolet range is important for analyzing materials that have significant interactions with this portion of the spectrum.

Visible Light means the portion of the electromagnetic spectrum that is detectable by the human eye, with wavelengths typically ranging from 400 nm to 700 nm. In this system, visible light is part of the spectral range analyzed by the detector. Understanding how materials interact with visible light is important for applications in areas such as display technology and lighting.

Wavelength means the distance between successive peaks of a wave, typically measured in nanometers (nm) for light waves. In this system, the wavelength is a key parameter measured by the spectrometer, with spectral data representing how the material interacts with different wavelengths of light. The system captures a wide range of wavelengths, from ultraviolet to near infrared, to provide a comprehensive analysis of the material's optical properties.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

As disclosed in TABLE 1, provided below, is an example of a string of code utilized to implement the optimized measurement apparatus which can store the data as a nested lists file.

TABLE 1

```
import serial
import time
import seabreeze.spectrometers as sb
import numpy as np
import win32gui
import win32com.client
import dae_RelayBoard
import traceback
import datetime as dt
import os, shutil
import ShutterControl as sc
import pandas as pd
import matplotlib.pyplot as plt
import seaborn as sns
################################################################################

shutterPort = 'COM4'
sh = sc.shutterSetup(shutterPort)
sc.closeShutter(sh)
################################################################################
second part
# Define the serial port and baud rate
port = "COM7"
baud = 115200
feedrate = 200 # Fixed feedrate
do_invert_movement = 0 # set to 0 for normal operation, set to 1 to move all stage steppers in reverse
(make sure you start from vertical position)
exp_filename = 'LED_270_wolight_stepsize_10degree_around_30_70_degree_every_10up' # this is the
specific name to put on the file, put grid_search for default, add a _inv if inverted, or whatever if you
want, the name will automatically have the date and time before this string that is being put in
# Open the serial port
ser2 = serial.Serial(port, baud, timeout=99999999)
```

TABLE 1-continued

```
while ser2.isOpen( )== 0:
   print("not open, waiting")
   time.sleep(0.5)
if ser2.isOpen( ):
   print(ser2.name + ' is open...')
#Wait for the serial connection to establish
time.sleep(3)
doZero = 0 # 1 for zeroing, 0 for no zeroing
test_power = 0 # fractional power of max to do angle tests at
darkwaittime = 60; #change back TO 60!
cutoff_wavlngth = 500 # bottom range of all spectral data collection
dark_inttime = 100_000 # default integration time in microseconds
saturation_threshold = 59000 # arbitrary units number that the sensor maxes out at, used to detect
saturation, set lower than max
devices = sb.list_devices( );
spec = sb.Spectrometer(devices[0]);
spec.integration_time_micros(dark_inttime)
print("spec init")
#Define the angle step
n_xlayer = 6 # amount of vertical layers to collect data from, apparatus will actuate to the next layer an
amount of times one less than this number
delta_xlayer = 10 # amount of degrees to move for each xlayer actuation (amount the apparatus moves
up)
n_ysteps = 36 # number of divisions around 360 degrees to collect data at (if this number is 3 it will
collect at 0, 120, 240, but not again at 360)
xDistArr = np.array(range(n_xlayer)) * delta_xlayer / 7.5 # these are the 1D arrays that define the
meshgrid that the data will be collected over, the last factor is to convert to distances for the stepper
motors
yDistArr = np.array(range(n_ysteps)) * (360/n_ysteps) / 4.5 # rounding to avoid floating point error in
motor motion from accumulating to an appreciable offset
print(f'xDistArr = {xDistArr}")
print(f'yDistArr = {yDistArr}")
collections_arr =     np.array([1,1,1,1,1,1], dtype=int) # amount of times to collect data with the
integration time corresponding to the array below, dtype=int to avoid floating point missmaches in the
checks
inttime_arr = 100_000 * np.array([6,6,6,6,6,6], dtype=int) # in microseconds, do not change the
100_000 number, change the integers
# checks to make sure the integration times and collection amounts are set up properly
if (len(collections_arr) != n_xlayer) or (len(inttime_arr) != n_xlayer):
   raise Exception("collections_arr or inttime_arr size mismatch with n_xlayer variable.")
total_inttimes = collections_arr * inttime_arr # for checking, this doesn't get used
total_inttimes = np.array(total_inttimes, dtype=int)
for i in range(len(total_inttimes)):
   if (total_inttimes [i]!=total_inttimes[0]):
      raise Exception(f"Total integration time inhomogeneity at index {i} with collections =
{collections_arr[i]} and inttime = {inttime_arr[i]} not matching the first time {total_inttimes [0]}")
#take dark spectra
wavelngth = np.array (spec.wavelengths( ));
print("Dark wait time started")
time.sleep(darkwaittime) #wait for transients to leave the device
dark = np.array(spec.intensities( )) / (dark_inttime/100_000); #take dark spectra and normalize to
100ms
print("Dark wait completed, moving on.")
time.sleep(10)
#Grid Data Dictionary, collections and inttime arrays are here because they may change based on the
xlayers
gridData = {'wavelngth': [ ], 'distances': [ ], 'intensities': [ ], 'avg_pulse_E': [ ], 'collections': [ ], 'inttimes':[ ]}
gridData['wavelngth'] = wavelngth[np.where(wavelngth > cutoff_wavingth)[0][0]:]
intmeanarr = [ ]
intmean = [ ]
################################################################################
## Setup Complete!
def makeLog(data, directory, test_name):
   start_time = dt.datetime.now( )
   start_time = start_time.strftime("%m_%d_%Y-%I_%M_%S_%p")
   # create the directory if it doesn't exist
   if os.path.isdir(f'{directory}/') != True:
      os.mkdir(f'{directory}/')
      print(f'Folder: {directory}/ created')
   # save the data file
   with open (f'{directory}/{start_time}_{test_name}.npy', 'wb') as file:
      np.save(file, data, allow_pickle=True) # to load this do: arr = np.load('filename.npy',
allow_pickle=True)
      print(f'File: {directory}/{start_time}_{test_name}.npy created')
   return f'{directory}/{start_time}_{test_name}.npy'
################################################################################

def movePlate(distance, feedrate, ser):
   cmd = f'G91 G01 X{distance} F{feedrate}\n';
   ser2.write(cmd.encode('ascii'));
```

TABLE 1-continued

```
###########################################################################

def distForPower(frac_power):
    k = np.pi / 12.5 # k=2pi/12.5 as 12.5 "distance" is the "wavelength"
    dist = (np.pi/2 - np.arccos(np.sqrt(frac_power)))/k # inverse of P = cos^2(kx-pi/2) as we start from
minimum
    return dist # return distance so that the program knows how far to move
###########################################################################

def initializePE10C(refrange):
    # refrange = 2 is 200uJ
    OphirCOM = win32com.client.Dispatch("OphirLMMeasurement.CoLMMeasurement");
    OphirCOM.StopAllStreams( );
    OphirCOM.CloseAll( );
    Device List = OphirCOM.ScanUSB( );
    Device Handle = np.array([ ]);
    for Device in DeviceList:
        Device Handle = np.append(DeviceHandle, OphirCOM.OpenUSBDevice(Device));
    refdet = DeviceHandle [0];
    OphirCOM.SetWavelength(refdet, 0, 1);
    wavelen = OphirCOM.getWavelengths(refdet, 0, 1, 1)
    OphirCOM.SetRange(refdet, 0, refrange) #Set the detector to range.
    # OphirCOM.SetRange(refdet, 0, 0);
    return (refdet, OphirCOM)
# this is split so that the initialization time doesn't affect coordination with something else
def startPE10C(refdet, OphirCOM):
    OphirCOM.StartStream(refdet, 0);
def getDataPE10C(refdet, OphirCOM):
    powerval = OphirCOM.GetData(refdet, 0); # get some data from the detector
    data = np.array(powerval[0]) # select just the pulse energies and format as an array for array
comprehension below
    data = data[data > 1e-9]
    data = data[data < 0.1]
    return data
def closePE10C(refdet, OphirCOM):
    OphirCOM.StopAllStreams( )
    OphirCOM.CloseAll( )
    OphirCOM = None
###########################################################################

def zeroPlate(testDist, feedrate, fine_width, n_fine):
    refdet, OphirCOM = initializePE10C(0) # set refrange to 1, corresponding to 2.00 uJ
    # calculates the total time of movement, 1500 corresponds to this setup and gear ratio, 50:1?
    testTime = 60*testDist / feedrate
    startPE10C(refdet, OphirCOM)
    movePlate(testDist, feedrate, ser2)
    time.sleep(testTime) # sleep until the stepper is done moving
    initial_zeroing_data = getDataPE10C(refdet, OphirCOM)
    plt.plot(initial_zeroing_data)
    plt.draw( )
    plt.pause(0.01)
    abs_min = initial_zeroing_data.min( )
    abs_max = initial_zeroing_data.max( )
    minLoc = np.where(initial_zeroing_data == initial_zeroing_data.min( ))[0][0] # gives an index
    minTime = testTime*minLoc / len(initial_zeroing_data)
    minDist = (minTime/testTime) * testDist
    distFromMin = testDist - minDist
    move Plate(-distFromMin, feedrate, ser2)
    time.sleep(1 + 60*np.abs(distFromMin)/feedrate)
    print("Initial zeroing complete. Grid searching for absolute minimum.")
    closePE10C(refdet, OphirCOM)
    time.sleep(1)
    refdet, OphirCOM = initializePE10C(2) # 200uJ range
    startPE10C(refdet, OphirCOM)
    time.sleep(3) # initialization time
    fine_dists = np.linspace(-fine_width, fine_width, n_fine)
    fine_dists = np.array([np.round(i, 2) for i in fine_dists])
    total_dist_moved = 0
    means = [ ] # avgs will be appended to and then lowest avg found and where matched to fine_dists
    for dist in fine_dists:
        dist_to_fine_dist = dist-total_dist_moved
        move Plate(dist_to_fine_dist, feedrate, ser2)
        total_dist_moved = dist
        time.sleep(1 + 60*np.abs(dist_to_fine_dist)/feedrate) # time for movement
        trash = OphirCOM.GetData(refdet, 0) # discard old data buffer
        time.sleep(2)
        data = getDataPE10C(refdet, OphirCOM)
        if (len(data) == 0):
            means.append(0)
            print("Null value read.\n")
```

TABLE 1-continued

```
        else:
            mean = data.mean( )
            means.append(mean)
            print(f'current_mean: {mean}\n abs_min / current mean = {np.round(100 * abs_min / mean)}%')
            print(f'current mean / abs_max = {np.round(100*mean / abs_max, 2)}%\n')
    means = np.array(means)
    min_indeces = np.where(means == means.min( ))[0]
    middle_min_index = min_indeces[int(len(min_indeces)/2)]
    dist_for_zero = fine_dists[middle_min_index]
    movePlate(dist_for_zero - total_dist_moved, feedrate, ser2)
    print(f'Moved {dist_for_zero} from initial zeroing to a mean minimum of {means.min( )}, lowest observed value: {abs_min}')
    log_data = {'initial_zeroing_data':initial_zeroing_data, 'fine_means':means}
    makeLog(log_data, 'calibration_data', 'zeroing_data')
    closePE10C(refdet, OphirCOM)
    print("Zeroing complete.")
##############################################################################
def shutter Data(collections, custom_inttime):
    global sh
    global shutterPort
    global saturation_threshold
    global dark
    sc.terminateShutter(sh)
    sh = sc.shutterSetup (shutterPort)
    # refresh spectrometer to fix data transfer error idk lol
    devices = sb.list_devices( );
    spec = sb.Spectrometer(devices [0]);
    spec.integration_time_micros(100_000)
    spec.intensities( )
    time.sleep(0.1)
    spec.integration_time_micros(custom_inttime)
    wav = spec.wavelengths( )
    # REQUIRES: refdet, OphirCOM, spec, darkspectra, sh
    data = {'wav': wav[np.where(wavelngth > cutoff_wavingth)[0][0]:],
        'specs': [ ],
        'spec_avg': [ ],
        'spec_sum': [ ],
        'pulse_E': [ ],
        'pulse_E_avg': [ ]}
    spec_set = [ ]
    sc.openShutter(sh)
    time.sleep(0.1)
    trash = OphirCOM.GetData(refdet, 0) # clear old data stream
    start = dt.datetime.now( )
    for k in range(int(collections)):
        spec_set.append(spec.intensities( ))
    stop = dt.datetime.now( )
    td = stop - start
    print(f'td: {td.seconds} seconds, {td.microseconds} us")
    powerval = OphirCOM.GetData(refdet, 0)
    sc.terminateShutter(sh)
    sh = sc.shutterSetup(shutterPort)
    sc.closeShutter(sh)
    # this line also normalizes the darkspectra to the integration time of the collections
    for speci in spec_set:
        if (np.max(speci) > saturation_threshold):
        print(f'Saturated value {np.max(speci)} detected is greater than saturation threshold {saturation_threshold}")
    data['specs'] = [speci[np.where(wavelngth > cutoff_wavingth)[0][0]:] - (custom_inttime/100_000)*dark[np.where(wavelngth > cutoff_wavingth)[0][0]:] for speci in spec_set]
    data['spec_avg'] = np.mean(data['specs'], axis=0)
    data['spec_sum'] = np.sum(data['specs'], axis=0)
    pulse = np.array(powerval[0]) # select just the pulse energies and format as an array for array comprehension below
    pulse = pulse [pulse > 1e-9] # get rid of wierd 0 values
    pulse = pulse [pulse < 0.1] # get rid of weird (serial?) signal
    data['pulse_E'].append(pulse)
    data['pulse_E_avg'].append(pulse.mean( ))
    #makeLog(data, 'shuttered_data', 'shuttered_data')
    spec.close( )
    return data
##############################################################################

def testFracPowers(frac_powers, feedrate, pulses, spec, ser2):
    data = {'wavelngth':spec.wavelengths( ), 'power_data':[ ], 'intensity_data':[ ]}
    sc.closeShutter(sh)
    time.sleep(10)
    darkspectra = spec.intensities( )
    print("Dark spectra complete")
    # start all the movements
```

TABLE 1-continued

```
        dist_moved = 0 # keeps track of the sum of distances so that the plate can be returned to starting
position after done
        for power in frac_powers:
            # ONLY RUN AFTER ZEROING, goes to the position for each fractional power and sits there for a
specified amount of time, collects data
            print(f"Testing frac power {power}")
            dist = np.round(distForPower(power), 2)
            dist_to_power = np.round(dist-dist_moved,2) # check how far it has to move to get to desired
position (all assuming 0 start position
            print(f"dist_to_power={dist_to_power}")
            movePlate(dist_to_power, feedrate, ser2)
            print(f"moved to power : {power}")
            time.sleep(1.5+np.abs(dist_to_power)*60/feedrate)
            dist_moved = dist
            # main data collection
            shutter_data = shutterData(pulses, inttime)
            data['power_data'].append(shutter_data['pulse_E'])
            data['intensity_data'].append(shutter_data['specs'])
            time.sleep(2)
        movePlate(-dist_moved, feedrate, ser2) # return plate to starting position
        resetTime = 60*np.abs(dist_moved)/feedrate
        time.sleep(resetTime+1)
        makeLog(data, 'jcurve_data', 'jcurve_data')
# Function to move the elevator along the Y-axis
def move_elevator_y(distance, feedrate):
    cmd = f'G91 G01 Y{distance} F{feedrate}\n'
    ser2.write(cmd.encode('ascii'))
    print(f"Moving Y-axis by {distance} units at feedrate {feedrate}")
# Function to move the elevator along the X-axis
def move_elevator_x(distance, feedrate):
    if (do_invert_movement == 0):
        cmd = f'G91 G01 Z{distance} F{feedrate}\n'
    elif (do_invert_movement == 1):
        cmd = f'G91 G01 Z{-distance} F{feedrate} \n'
    ser2.write(cmd.encode('ascii'))
    print(f"Moving X-axis by {distance} units at feedrate {feedrate}")
##################################################################################
## Setup that requires functions
time.sleep(0.5)
if(doZero==1):
    zeroPlate(15, 100, 1, 17)
"""refdet, OphirCOM = initializePE10C( )
startPE10C(refdet, OphirCOM)
fracPowers = np.array([0.1, 0.2, 0.3, 0.4, 0.5])
fracPowers = np.array([0.05, 0.1, 0.15, 0.2, 0.25, 0.3, 0.35, 0.40, 0.45, 0.50])
testFracPowers(fracPowers, 100, 5, spec, ser2)"""
time.sleep(0.5)
dist_to_test_power = np.round(distForPower(test_power), 2)
movePlate(dist_to_test_power, 100, ser2)
print(f"Moving to fractional power of : {test_power}")
time.sleep(6)
print("\nBeginning angle sweep\n")
refdet, OphirCOM = initializePE10C(1)
startPE10C(refdet, OphirCOM)
##################################################################################
#########
ser2.close( )
print("initializing for the loop ")
time.sleep(0.5)
# setting up active figure for data visualization while the experiment is running
fig1, ax1 = plt.subplots( )
ax1.set_title ("Last few collected spectra")
ax1.set_xlabel('Wavelength (nm)')
ax1.set_ylabel('Intensity (AU)')
for i in range(n_xlayer):
    if i>0:
        ser2 = serial.Serial(port, baud, timeout=999999)
        print("open1")
        time.sleep(2)
        move_elevator_x(xDistArr [i] − xDistArr[i-1], feedrate)
        time.sleep(0.4 + 60*(xDistArr[i] − xDistArr[i-1])/feedrate)
        ser2.close ( )
        print("close1")
        time.sleep(0.5)
    for j in range(n_ysteps):
        if (j>0) and (i%2 == 0):
            ser2 = serial.Serial(port, baud, timeout=999999)
            print("open2")
            time.sleep(2)
            move_elevator_y(yDistArr[j] − yDistArr[j-1], feedrate)
```

TABLE 1-continued

```
        time.sleep(0.4 + 60*(yDistArr[j] − yDistArr[j−1]) / feedrate)
        gridData['distances'].append([xDistArr [i] * 7.5, yDistArr [j] * 4.5])
        print(f'Current Position: {xDistArr[i] * 7.5} up, and {yDistArr [j] * 4.5} around.")
        ser2.close( )
        print("close2")
      if (j>0) and (i%2==1):
        ser2 = serial.Serial(port, baud, timeout=999999)
        print("open2")
        time.sleep(2)
        move_elevator_y(yDistArr[−(j+1)] − yDistArr[−j], feedrate)
        time.sleep(0.4 + 60*(yDistArr[−]] − yDistArr[−(j+1)]) / feedrate)
        gridData['distances'].append([xDistArr[i] * 7.5, yDistArr[−(j+1)] * 4.5])
        print(f'Current Position: {xDistArr[i] * 7.5} up, and {yDistArr[−(j+1)] * 4.5} around.")
        ser2.close( )
        print("close2")
      if (j==0 and (i%2==0)):
        gridData['distances']. append([xDistArr[i] * 7.5, yDistArr [0] * 4.5])
        print(f'Current Position: {xDistArr[i] * 7.5} up, and {yDistArr[0] * 4.5} around.")
      if (j==0 and (i%2==1)):
        gridData['distances'].append([xDistArr[i] * 7.5, yDistArr[−1] * 4.5])
        print(f'Current Position: {xDistArr[i] * 7.5} up, and {yDistArr[−1] * 4.5} around.")
      print(f'Getting shuttered data with {collections_arr[i]} collections at {inttime_arr[i]} micros each")
      shuttered_data = shutterData(collections_arr[i], inttime_arr[i])
      gridData["intensities"].append(list(shuttered_data['spec_avg']))
      gridData['avg_pulse_E'].append(shuttered_data['pulse_E_avg'])
      gridData['collections'].append(collections_arr[i])
      gridData['inttimes'].append(inttime_arr[i])
      for line in ax1.lines:
        line.remove( )
      for k in range (len(gridData['intensities']) if len(gridData['intensities']) < 5 else 5):
        ax1.plot(gridData['wavelngth'], gridData['intensities'] [−(k+1)], label=f '{k} points ago')
        ax1.legend( )
        plt.draw( )
      plt.pause(0.01)
      """
      if (j==n_ysteps−1):
        ser2 = serial.Serial(port, baud, timeout=999999)
        print("open3")
        time.sleep(2)
        move_elevator_y(−yDistArr[j], feedrate)
        time.sleep(0.4 + 60*(yDistArr[j]) / feedrate)
        ser2.close( )
        print("close3")
        time.sleep(0.5)
      """
  if i==n_xlayer−1:
    ser2 = serial.Serial(port, baud, timeout=999999)
    print("open4")
    time.sleep(2)
    move_elevator_x(−xDistArr[i], feedrate)
    time.sleep(0.4 + 60*(xDistArr[i])/feedrate)
    ser2.close( )
    print("close4")
    time.sleep(0.5)
    if (i%2==0):
      ser2 = serial.Serial(port, baud, timeout=999999)
      print("open2")
      time.sleep(2)
      move_elevator_y(−yDistArr[−1], feedrate)
      time.sleep(0.4 + 60*(yDistArr[−1] / feedrate))
      ser2.close( )
      print("close2")
gridData['intensities'] = np.array(gridData['intensities'])
intMax = [ ]
sparseMaxDist = [0,0]
for spectra in gridData['intensities']:
  intMax.append(spectra.max( ))
print(intMax)
intMax = np.array(intMax)
sparseMaxDist = gridData['distances'] [np.where(intMax == intMax.max( )) [0][0]]
print(f'sparseMaxDist = {sparseMaxDist}, moving...")
grid_name = makeLog(gridData, "grid_search", exp_filename)
heatmap
import seaborn as sns
import matplotlib.pyplot as plt
import pandas as pd
grid = np.load(grid_name, allow_pickle=True).tolist( )
wavelngth = grid ['wavelngth']
dists = grid['distances']
intensities = grid['intensities']
```

TABLE 1-continued

```
x = [dist[0] for dist in dists]
y = [dist[1] for dist in dists]
int_maxs = np.mean(np.array(intensities), axis=1)
print(f'int_maxs type: {type(int_maxs)}, and has values {int_maxs}')
df = pd.DataFrame(data=[x, y, int_maxs]).T
print(df)
df = df.rename(columns={0: 'x', 1: 'y', 2: 'int_max'})
print(df)
df = df.pivot(index='x', columns='y', values='int_max')
fig = plt.figure( )
snsplot = sns.heatmap (df)
plt.show( )
ser2.close( )
sc.terminateShutter(sh)
```

INCORPORATION BY REFERENCE

Dawson, Nathan J. et al. "Reduced ASE threshold from aperiodic photonic structures in rhodamine B-doped king salmon (*oncorhynchus tshawytscha*) iridophores." J. Lumin. (2022). Sep. 24, 2021.

Dawson, Nathan J. et al. "Low-cost automated spin coater and thermal annealer for additive prototyping of multilayer Bragg reflectors" Am. J. Phys. 91, 48-55 (2023). Jan. 1, 2023.

Kumiko Fukue. "APPARATUS FOR DETECTING POSITION OF SUBSTRATE, ELLIPSOMETER, AND FILM THICKNESS MEASURING APPARATUS." U.S. Pat. No. 7,557,919. United States Patent and Trademark Office. Mar. 5, 2009.

Mark Trulson et al. "METHOD AND APPARATUS FOR IMAGING A SAMPLE ON A DEVICE." U.S. Patent Publication No. 2005/0200948. United States Patent and Trademark Office. Sep. 15, 2005.

Yiping Xu et al. "SPECTROSCOPIC SCATTERMOTER SYSTEM." U.S. Pat. No. 7,173,699. United States Patent and Trademark Office. Feb. 6, 2007.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. An apparatus for scanning properties of a material, comprising:
    a stationary sample stage configured to support a material in a fixed position;
    a first motor operatively connected to a horizontal jib arm, the first motor being configured to rotate the jib arm about a first axis to scan the material along an azimuthal angle;
    a second motor mounted on the horizontal jib arm, the second motor being configured to rotate about a second axis, perpendicular to the first axis, to scan the material along a polar angle;
    a boom arm attached to the second motor, the boom arm extending away from the jib arm and supporting an optical system directed toward the sample stage;
    the optical system comprising a tube assembly to secure adjustable imaging lenses and optical filters, the tube assembly being positioned to collect an amount of radiation from the material;
    a sensor attachment mounted on the tube assembly, the sensor attachment being configured to connect to at least one detector for capturing data related to the material; and
    a control system communicatively coupled to the first and second motors, the control system being configured to transmit an electrical signal to the first and second motors to coordinate a rotation of the jib arm and boom arm, thereby enabling scanning of the material across a range of azimuthal and polar angles.

2. The apparatus of claim 1, further comprising a static pump polarization system, wherein the static pump polarization system is configured to maintain the orientation of a linearly polarized excitation source relative to the photonic structure of the material during the scanning process.

3. The apparatus of claim 1, further comprising a base mount, wherein the base mount is engaged with the stationary sample stage, whereby the base mount translates the stationary sample stage along an x-axis and a y-axis.

4. The apparatus of claim 1, further comprising a mirror system, wherein the mirror system positioned vertically over the stationary sample stage, the mirror system configured to direct an external light source incident on the stationary sample stage.

5. The apparatus of claim 4, wherein the mirror system further comprises a fiber positioned beneath the stationary sample stage configured to illuminate the stationary sample stage.

6. The apparatus of claim 1, further comprising an X-Y micro-positioning stage, wherein the X-Y micro-positioning stage is mechanically engaged with the stationary sample stage configured to traverse the stationary sample stage along an x-axis and a y-axis.

7. The apparatus of claim 1, further comprising a base plate wherein the base plate is configured to secure the apparatus to a surface.

8. The apparatus of claim 1, further comprising a spectrometer mounted onto the boom arm.

9. The apparatus of claim 1, wherein the at least one detector for capturing data within the sensor comprises at least one of a digital camera, photodiode, spectrometer, phototransistor, pyroelectric or thermopile.

10. The apparatus of claim 1, wherein the sensor attachment mounted to the tube assembly configured to be manipulated about an x-axis, y-axis, and a z-axis.

11. The apparatus of claim 1, wherein the stationary sample stage may comprise at least one of a piezoelectric cooling stage, temperature-controlled stage, thermoelectric cooling stage, or cryogenic cooling stage.

12. An apparatus for scanning properties of material, comprising:
   a stationary sample stage configured to support a material in a fixed position;
   a first motor operatively connected to a rotation stage, the first motor being configured to rotate the rotation stage about a first axis to scan the material along an azimuthal angle;
   a second motor mounted on the rotation stage, the second motor being configured to rotate about a second axis, perpendicular to the first axis, to scan the material along a polar angle;
   a boom arm attached to the second motor, the boom supporting an optical system directed toward the sample stage;
   an optical system comprising a tube assembly to secure adjustable imaging lenses and optical filters, the tube assembly being positioned to collect radiation from the material;
   a sensor attachment mounted on the tube assembly, the sensor attachment being configured to connect to at least one detector for capturing data related to the material; and
   a control system communicatively coupled to the first and second motors, the control system being configured to transmit an electrical signal to the first and second motors to coordinate a rotation of the jib arm and boom arm, thereby enabling scanning of the material across a range of azimuthal and polar angles.

13. The apparatus of claim 12, wherein the rotation stage comprises a central boring, whereby the stationary sample stage extends through the central boring.

14. The apparatus of claim 12, further comprising a static pump polarization system, wherein the static pump polarization system is configured to maintain the orientation of a linearly polarized excitation source relative to the photonic structure of the material during the scanning process.

15. The apparatus of claim 12, further comprising a base mount, wherein the base mount is engaged with the stationary sample stage, whereby the base mount translates the stationary sample stage along an x-axis and a y-axis.

16. The apparatus of claim 12, further comprising a mirror system, wherein the mirror system positioned vertically over the stationary sample stage, the mirror system configured to direct an external light source incident on the stationary sample stage.

17. The apparatus of claim 12, wherein the mirror system further comprises a fiber positioned beneath the stationary sample stage configured to illuminate the stationary sample stage.

18. The apparatus of claim 12, further comprising an X-Y micro-positioning stage, wherein the X-Y micro-positioning stage is mechanically engaged with the stationary sample stage configured to traverse the stationary sample stage along an x-axis and a y-axis.

19. The apparatus of claim 12, further comprising a base plate wherein the base plate is configured to secure the apparatus to a surface.

20. The apparatus of claim 12, further comprising a spectrometer mounted onto the boom arm.

21. The apparatus of claim 12, wherein the at least one detector for capturing data within the sensor comprises at least one of a digital camera, photodiode, spectrometer, phototransistor, pyroelectric, or thermopile.

22. The apparatus of claim 12, wherein the sensor attachment mounted to the tube assembly configured to be manipulated about an x-axis, y-axis, and a z-axis.

23. The apparatus of claim 12, wherein the stationary sample stage may consist of a piezoelectric cooling stage, temperature-controlled stage, thermoelectric cooling stage, or cryogenic cooling stage.

24. A method for scanning the spectrum of an emissive material, the method comprising:
   providing an apparatus for scanning properties of material, the apparatus comprising:
      a stationary sample stage configured to support a material in a fixed position;
      a first motor operatively connected to a rotation stage, the first motor configured to rotate the rotation stage about a first axis to scan the material along an azimuthal angle;
      a second motor mounted on the rotation stage, the second motor configured to rotate about a second axis, perpendicular to the first axis, to scan the material along a polar angle;
      a boom arm attached to the second motor, supporting an optical system directed toward the sample stage;
      an optical system comprising a tube assembly to secure adjustable imaging lenses and optical filters, the tube assembly positioned to collect radiation from the material;
      a sensor attachment mounted on the tube assembly, the sensor attachment configured to connect to at least one detector for capturing data related to the material; and
      a control system configured to operate the first and second motors, allowing for the coordinated rotation of the rotation stage and boom arm to enable scanning of the material across a range of azimuthal and polar angles;
   coupling an external light source to be utilized to excite the emissive material;
   capturing a dark spectrum, whereby the apparatus for scanning properties of material is configured to record a baseline measurement without any incident light on the emissive material;
   collecting a spectrum data, wherein the apparatus for scanning properties of material is configured to record the spectrum data form the sample at the current azimuth and polar angle settings;
   adjusting the apparatus for scanning properties of material until the maximum azimuth angle has been reached; and
   adjusting the apparatus for scanning properties of material until the maximum polar angle has been reached.

25. The method claim of 24, wherein the apparatus for scanning properties of material further comprises a horizontal jib arm wherein the first motor operatively connected to a horizontal jib arm, the first motor configured to rotate the jib arm about a first axis to scan the material along an azimuthal angle, whereby the second motor is mounted to the horizontal jib arm.

26. The method of claim 24, further comprising the step of, coupling an external light source to excite the emissive material.

27. The method of claim 26, further comprising the step of, opening a shutter concealing the light source, whereby the light source may illuminate the emissive material.

28. The method of claim 26, further comprising the step of, closing the shutter wherein the apparatus for scanning properties of material can proceed to capturing the dark spectrum.

29. The method of claim 24, further comprising the step of, moving the apparatus for scanning properties of material by at least one predetermined increment if the maximum azimuth angle has not been reached.

30. The method of claim 24, further comprising the step of, moving the apparatus for scanning properties of material by at least one predetermined increment if the maximum polar angle has not been reached.

* * * * *